(12) United States Patent
Jung et al.

(10) Patent No.: US 12,085,294 B2
(45) Date of Patent: Sep. 10, 2024

(54) SMART AIR CONDITIONER FOR REDUCTION IN FINE DUST AND HARMFUL GAS

(71) Applicant: PANOTEC CO., LTD., Seongnam-si (KR)

(72) Inventors: Kwang Woo Jung, Seongnam-si (KR); Jong Ho Jung, Seongnam-si (KR); Jin Ku Kim, Uiwang-si (KR)

(73) Assignee: PANOTEC CO., LTD., Seongnam-si (KR)

( * ) Notice: Subject to any disclaimer, the term of this patent is extended or adjusted under 35 U.S.C. 154(b) by 690 days.

(21) Appl. No.: 17/280,695

(22) PCT Filed: Dec. 11, 2020

(86) PCT No.: PCT/KR2020/018202
§ 371 (c)(1),
(2) Date: Mar. 26, 2021

(87) PCT Pub. No.: WO2021/125713
PCT Pub. Date: Jun. 24, 2021

(65) Prior Publication Data
US 2022/0120460 A1    Apr. 21, 2022

(30) Foreign Application Priority Data

Dec. 19, 2019    (KR) .................. 10-2019-0171275
Oct. 16, 2020    (KR) .................. 10-2020-0134411

(51) Int. Cl.
*F24F 3/16*    (2021.01)
*F24F 7/00*    (2021.01)
(Continued)

(52) U.S. Cl.
CPC ................ *F24F 11/30* (2018.01); *F24F 7/08* (2013.01); *F24F 12/006* (2013.01); *F24F 13/10* (2013.01);
(Continued)

(58) Field of Classification Search
CPC .. F24F 7/003; F24F 7/08; F24F 12/006; F24F 8/10; F24F 8/108; F24F 11/39;
(Continued)

(56) References Cited

U.S. PATENT DOCUMENTS 1,938,801 A * 12/1933 Bourne ................ F24F 1/031
165/122
4,428,205 A * 1/1984 Doderer ................ F24F 3/153
62/93

(Continued)

FOREIGN PATENT DOCUMENTS

JP    H06-235535 A    8/1994
JP    2005-061641 A    3/2005
(Continued)

OTHER PUBLICATIONS

Mattias Grenback, "Search Report for EP Application No. 20866915. 0", Mar. 27, 2024, EPO, Munich, DE.

*Primary Examiner* — Frantz F Jules
*Assistant Examiner* — Jason N Thompson
(74) *Attorney, Agent, or Firm* — Bridgeway IP Law Group, PLLC; Jihun Kim

(57) ABSTRACT

A smart air conditioner for reduction in fine dust and harmful gas includes: an eternal chamber including a first side coupled to communicate with an interior and a second side communicating with an exterior; an internal chamber disposed to pass through an inside of the external chamber and including a first side coupled to communicate with an interior and a second side communicating with an exterior;

(Continued)

an external chamber damper installed in the external chamber and controlling air flow; and an internal chamber damper installed in the internal chamber and controlling air flow.

6 Claims, 28 Drawing Sheets

(51) Int. Cl.
| | |
|---|---|
| *F24F 7/08* | (2006.01) |
| *F24F 8/108* | (2021.01) |
| *F24F 11/00* | (2018.01) |
| *F24F 11/30* | (2018.01) |
| *F24F 12/00* | (2006.01) |
| *F24F 13/10* | (2006.01) |
| *F24F 13/20* | (2006.01) |
| *F24F 13/22* | (2006.01) |
| *F24F 13/28* | (2006.01) |
| *F28D 7/10* | (2006.01) |
| *F28F 1/08* | (2006.01) |
| *F28F 1/10* | (2006.01) |

(52) U.S. Cl.
CPC ................ *F24F 13/20* (2013.01); *F28D 7/10* (2013.01); *F28F 1/08* (2013.01); *F28F 1/105* (2013.01)

(58) Field of Classification Search
CPC .......... F24F 13/28; F24F 3/16; F24F 11/0001; F24F 13/22; F28D 7/10
See application file for complete search history.

(56) References Cited

U.S. PATENT DOCUMENTS

| | | | | |
|---|---|---|---|---|
| 2006/0086058 | A1* | 4/2006 | Reinders | F28D 5/00 |
| | | | | 62/304 |
| 2011/0036541 | A1* | 2/2011 | Takada | F24F 12/006 |
| | | | | 165/59 |
| 2012/0071081 | A1* | 3/2012 | Park | F24F 12/006 |
| | | | | 454/252 |
| 2015/0292761 | A1* | 10/2015 | Teoh | F24F 12/006 |
| | | | | 62/314 |
| 2017/0045282 | A1* | 2/2017 | Thornberry, Jr. | F15D 1/0025 |
| 2020/0271349 | A1* | 8/2020 | Fukumoto | E06B 7/10 |
| 2021/0197110 | A1* | 7/2021 | Han | B01D 46/442 |

FOREIGN PATENT DOCUMENTS

| | | | |
|---|---|---|---|
| JP | 2011102672 A | | 5/2011 |
| KR | 2006 0105295 A | * | 10/2006 |
| KR | 100632186 B1 | | 10/2006 |
| KR | 100743224 B1 | | 7/2007 |
| KR | 20100120467 A | | 11/2010 |
| KR | 20110050124 A | | 5/2011 |
| KR | 101133044 B1 | | 4/2012 |
| KR | 10-1437291 B1 | * | 9/2014 |
| KR | 10-1513651 B1 | | 4/2015 |
| KR | 10-1652214 B1 | | 9/2016 |
| KR | 20170021045 A | | 2/2017 |
| KR | 10-2019-0006792 A | | 1/2019 |
| KR | 10-2011247 B1 | | 8/2019 |

* cited by examiner

SMART AIR CONDITIONER FOR REDUCTION IN FINE DUST AND HARMFUL GAS

TECHNICAL FIELD

The disclosure relates to a smart air conditioner for reduction in fine dust and harmful gas, and more particularly to a smart air conditioner for reduction in fine dust and harmful gas, which circulates indoor air after removing contaminants without taking air therein or exchanging heat with external air, and prevents condensation or formation of a condensate by performing previous heat exchange before taking external air into a total heat exchanger.

BACKGROUND ART

In general, a school, a house, a building and the like structures have a system for heating and cooling to maintain proper indoor temperature.

Further, the structures need to be periodically ventilated by opening a window or the like to maintain proper indoor air quality, but the opening of the window while the heating and cooling system is operating has disadvantages that energy costs are increased due to increase in heating and cooling loads because heated or cooled indoor air escapes outward, and air polluted with car fumes, yellow dust, etc. comes in from the outside.

In particular, the yellow dust refers to fine dust, which originates in China, Mongolia and the like region and mostly includes soil components such as silicon, iron, manganese, aluminum, etc. but has recently included a high content of heavy metals such as lead, cadmium, etc. or harmful chemicals such as dioxin with industrialization of China, thereby getting more harmful and serious.

To solve such problems, a total heat exchanging apparatus or the like air conditioner has been developed and used.

The total heat exchanging apparatus, as it is known, includes a total heat exchanging element having a heat exchanging function, and a ventilating apparatus body accommodating the total heat exchanging element therein, in which the ventilating apparatus body includes an indoor air supply port for supplying fresh air to the inside of the structure, an indoor air exhaust port for sending indoor polluted air out, an outdoor air supply port for forcibly supplying fresh air (external air) from an outer wall of the structure to the inside of the structure, and an outdoor air exhaust port for sending the indoor polluted air out.

The total heat exchanging apparatus serves to transfer some energy to hot air supplied from the exterior, inside the total heat exchanging element as cold air escapes in summer, thereby introducing (returning) the energy again into the interior. On the other hand, the total heat exchanging apparatus serves to transfer some energy to cold air supplied from the exterior, inside the total heat exchanging element as hot air escapes in winter, thereby introducing (returning) the energy again into the interior.

As described above, the total heat exchanging apparatus improves thermal efficiency by recovering and using some energy (waste heat) wasted during ventilation, but has limitations of various problems as follows.

First, a conventional total heat exchanging apparatus has a drawback that it fails to work properly or malfunctions because the ventilating apparatus body or the total heat exchanging element is clogged up by condensation or a condensate is formed therein due to sharp temperature difference when external air of low temperature comes in in winter.

Further, a conventional total heat exchanging apparatus has a drawback that energy is grossly wasted because heat exchange partially occurs even though exhaust indoor air passes through the total heat exchanging element and thus cold or hot indoor air substantially different in temperature from the external air is still discharged.

Further, a conventional total heat exchanging apparatus has a problem of low economically feasibility due to increase in heating and cooling loads because ventilation is required at high fine-dust concentration even though concentration of carbon dioxide or the like harmful gas contained in the indoor air is appropriate and does not require the ventilation.

DISCLOSURE

Technical Problem

Accordingly, the disclosure is proposed based on the foregoing content, and an aspect of the disclosure is to provide a smart air conditioner for reduction in fine dust and harmful gas, which previously performs heat exchange with internal air before external air is introduced into a total heat exchanger, thereby preventing ice formation or condensate formation and improving operation stability and durability.

Another aspect of the disclosure is to provide a smart air conditioner for reduction in fine dust and harmful gas, which circulates indoor air after removing pollutants from the indoor air without introduction of external air or heat exchange with external air.

Still another aspect of the disclosure is to provide a smart air conditioner for reduction in fine dust and harmful gas, which significantly enhances a heat exchange efficiency to minimize heating and cooling loads, thereby decreasing energy costs.

Technical Solution

According to an aspect of the disclosure, there is provided a smart air conditioner for reduction in fine dust and harmful gas, including: an eternal chamber including a first side coupled to communicate with an interior and a second side communicating with an exterior; an internal chamber disposed to pass through an inside of the external chamber and including a first side coupled to communicate with an interior and a second side communicating with an exterior; an external chamber damper installed in the external chamber and controlling air flow; and an internal chamber damper installed in the internal chamber and controlling air flow.

According to an aspect of the disclosure, there is provided a smart air conditioner for reduction in fine dust and harmful gas, to be coupled to a ventilation apparatus including an air supply port and an air exhaust port, including: an external chamber including a first side coupled to communicate with the ventilating apparatus and a second side communicating with an exterior; an internal chamber disposed to pass through an inside of the external chamber and including a first side coupled to communicate with the ventilating apparatus and a second side communicating with an exterior; an external chamber damper installed in the external chamber and controlling air flow; and an internal chamber damper installed in the internal chamber and controlling air flow, the external chamber including an outer container body of which a chamber external-air exhauster is connected to the air supply port to supply external air introduced from a chamber external-air introducer, and the internal chamber including an inner container body of which a chamber internal-air introducer is connected to the air exhaust port and which is formed with a chamber internal-air exhauster to communicate with an outside of the outer container body.

Further, the internal chamber may include a branch formed to communicate with an inner space of the external chamber, the internal chamber damper may include an internal-air exhaust-control two-way damper installed in the chamber internal-air exhauster, and an internal-air circulation-control two-way damper installed in the branch, and the external chamber damper may include an external-air inflow-control two-way damper installed in the chamber external-air introducer.

Further, the internal chamber may include a branch formed to communicate with an inner space of the external chamber, the internal chamber damper may include a three-way damper installed in the branch and used for exhaust control of internal air and circulation control of internal air, and the external chamber damper may include an external-air inflow-control two-way damper installed in the chamber external-air introducer.

Meanwhile, according to an aspect of the disclosure, there is provided a smart air conditioner for reduction in fine dust and harmful gas, to be coupled to a ventilation apparatus including an air supply port and an air exhaust port, including: an external chamber including a first side coupled to communicate with the ventilating apparatus and a second side communicating with an exterior; an internal chamber disposed to pass through an inside of the external chamber and including a first side coupled to communicate with the ventilating apparatus and a second side communicating with an exterior; an external chamber damper installed in the external chamber and controlling air flow; and an internal chamber damper installed in the internal chamber and controlling air flow, the external chamber including an outer container body formed with a chamber internal-air exhauster from which internal air introduced through a chamber internal-air introducer communicating with the air exhaust port is discharged, and the internal chamber of which a chamber external-air exhauster is connected to the air supply port and which includes an inner container body formed with a chamber external-air introducer to communicate with an outside of the outer container body.

Here, the internal chamber may include a branch formed to communicate with an inner space of the external chamber, the internal chamber damper may include an external-air inflow-control two-way damper installed in the chamber external-air introducer, and an internal-air circulation-control two-way damper installed in the branch, and the external chamber damper may include an internal-air exhaust-control two-way damper installed in the chamber internal-air exhauster.

Further, the internal chamber may include a branch formed to communicate with an inner space of the external chamber, the internal chamber damper may include a three-way damper installed in the branch and used for inflow control of external air and circulation control of internal air, and the external chamber damper may include an internal-air exhaust-control two-way damper installed in the chamber internal-air exhauster.

The smart air conditioner for reduction in fine dust and harmful gas may further include a heat conductor formed in at least one of the internal chamber and the external chamber so that heat exchange can be carried out based on temperature difference between air in the external chamber and air in the internal chamber while flowing.

Here, the heat conductor may include at least one selected from a wrinkled portion formed in the internal chamber and a heat transfer member formed in the internal chamber.

The smart air conditioner for reduction in fine dust and harmful gas may further include an air flowing guide installed to form turbulence and increase stay time of air flowing through the external chamber.

Here, the air flowing guide may include a spiral guiding member disposed between the external chamber and the internal chamber.

The spiral guiding member may include a band-type spiral plate formed to be spirally wound between an outer circumferential surface of the external chamber and an inner surface of the internal chamber.

Further, the air flowing guide may include a plurality of air guide plates alternately disposed to form a zigzag channel between the external chamber and the internal chamber.

Meanwhile, The smart air conditioner for reduction in fine dust and harmful gas may further include a condition sensing means installed in at least one of the ventilating apparatus, the external chamber and the internal chamber, and a controller to control the external chamber damper, the internal chamber damper and the ventilating apparatus to be driven based on a detection signal from the condition sensing means.

The condition sensing means may include at least one selected among a pressure sensing means, a temperature sensing means, a humidity sensing means, an electric conductivity sensing means, a gas sensing means, a flowrate measurement means, and a fine-dust concentration-measurement means.

Further, the smart air conditioner for reduction in fine dust and harmful gas may further include a heating means installed inside the external chamber or the internal chamber and raising temperature of air.

The smart air conditioner for reduction in fine dust and harmful gas may further include a filtering means installed inside the external chamber or the internal chamber and purifying air.

Meanwhile, the smart air conditioner for reduction in fine dust and harmful gas may further include a water remover installed to remove water produced inside the external chamber or the internal chamber.

The water remover may include a drain line formed in the external chamber.

Further, the water remover may further include at least one among a dehumidifier module to perform dehumidification when powered on, a hydrophobic coating layer formed on an outer surface of the internal chamber and an inner surface of the external chamber, a control valve installed in the drain line, and a drain-line heat-generation means installed in the drain line.

The internal chamber may include a first side communicating with the ventilating apparatus and a second side communicating with an exterior, the first and second sides including holes disposed to diagonally face each other, and the external chamber includes a first side communicating with the ventilating apparatus and a second side communicating with an exterior, the first and second sides including holes disposed to diagonally face each other, and the holes of the external chamber and the holes of the internal chamber are formed in misaligned directions.

Meanwhile, according to an aspect of the disclosure, there is provided a smart air conditioner for reduction in fine dust and harmful gas, including: an eternal chamber including a first side coupled to communicate with an interior and a second side communicating with an exterior; an internal chamber disposed to pass through an inside of the external chamber and including a first side coupled to communicate with an interior and a second side communicating with an exterior; an external chamber damper to control air flowing into the external chamber; an internal chamber damper to control air flowing into internal chamber; an internal chamber fan to exert suction force to make air flow into the internal chamber; and an external chamber fan to exert suction force to make air flow into the external chamber.

Here, the external chamber may include an outer container body formed with a chamber internal-air introducer through which internal air is introduced, a chamber internal-air exhauster through which internal air is discharged, a chamber external-air introducer through which external air is introduced, and a chamber external-air exhauster through which external air is discharged.

The internal chamber may include an inner container body provided to make external air introduced through the chamber external-air introducer flow toward the chamber external-air exhauster.

Preferably, the internal chamber may include: a connection inner container body connected between the chamber internal-air introducer and the inner container body; an external-air mix control damper installed to control internal air flowing toward the connection inner container body; and an internal-air control damper installed to control flow of internal air discharged to an exterior.

Further, the internal chamber fan may be installed in the inner space adjoining the chamber external-air introducer to supply air toward the chamber external-air exhauster, and the external chamber fan may be installed in the connection inner container body adjoining the chamber internal-air introducer.

Preferably, The smart air conditioner for reduction in fine dust and harmful gas may further include: a first fan installation portion including: a first fan installation box installed in the connection inner container body and provided with the external chamber fan, a connection exhauster formed in the first fan installation box to communicate with the inner space of the external chamber, a first connector formed in the first fan installation box to connect with the connection inner container body, and a second connector connected to communicate with the chamber internal-air introducer and formed in the first fan installation box; and a second fan installation portion including: a second fan installation box installed in the inner container body and internally provided with the internal chamber fan, a third connector connected to the second fan installation box to communicate with the chamber external-air introducer, and a fourth connector formed in the second fan installation box to connect with the inner container body.

Here, in the smart air conditioner for reduction in fine dust and harmful gas according to the disclosure, the internal air control damper may be installed in the connection exhauster of the first fan installation portion, and the external-air mix control damper may be installed in the first connector, the internal chamber damper may be installed in the third connector of the second fan installation portion, and the external chamber damper may be installed in the chamber internal-air exhauster.

Further, the external chamber may include an outer container body formed with a chamber internal-air introducer through which internal air is introduced, a chamber internal-air exhauster through which internal air is discharged, a chamber external-air introducer through which external air is introduced, and a chamber external-air exhauster through which external air is discharged, and the internal chamber may include an inner container body disposed to make the external air introduced through the chamber external-air introducer to flow in the chamber external-air exhauster, and a partition wall installed in the inner space of the outer container body to form a partitioned space communicating with the inner container body and surrounding the chamber external-air exhauster.

Here, the internal chamber may include a connection inner container body connected between the chamber internal-air introducer and the inner container body, the connection inner container body may be installed with an external-air mix control damper to control air flowing toward the inner container body, and the inner container body adjoining the internal chamber fan may be installed with the internal chamber damper to face the external-air mix control damper.

In addition, the external chamber fan may be installed in the connection inner container body to control flow of internal air discharged to an exterior, and the internal chamber fan may be installed in the inner container body adjoining the chamber external-air introducer.

Meanwhile, The smart air conditioner for reduction in fine dust and harmful gas may further include: a first fan installation portion including: a first fan installation box installed in the connection inner container body and provided with the external chamber fan, a connection exhauster formed in the first fan installation box to communicate with the inner space of the external chamber and installed with the external chamber damper, a first connector formed in the first fan installation box to connect with the external-air mix control damper, and a second connector connected to communicate with the chamber internal-air introducer and formed in the first fan installation box; and a second fan installation portion including: a second fan installation box installed in the inner container body and internally provided with the internal chamber fan, a third connector formed in the second fan installation box to connect with the chamber external-air introducer, and a fourth connector formed in the second fan installation box to connect with the inner container body.

The smart air conditioner for reduction in fine dust and harmful gas may further include a heat conductor connected to the internal chamber to enhance a heat exchange efficiency.

The heat conductor may include a duct formed with a zigzag structure. In this case, the duct may include: a hollow duct main body; and a curved channel forming portion installed inside the duct main body and spirally wound up.

Further, the heat conductor may include a plurality of thermal conductive plates arranged to form a zigzag channel.

Advantageous Effects

As described above, in the smart air conditioner for reduction in fine dust and harmful gas according to the disclosure, the internal chamber in which indoor air or external air flows is separately provided inside the external chamber, and thus the previous heat exchanging process is performed before external air is introduced into the total heat exchanger, thereby having effects on reducing energy costs as the heat exchange is significantly enhanced to minimize cooling and heating loads, and improving stability of operation and durability as icemaking or formation of a condensate due to external air is prevented.

Further, in the smart air conditioner for reduction in fine dust and harmful gas according to the disclosure, when only concentration of fine dust is high even though ventilation is not required because concentration of carbon dioxide contained in indoor air is proper, indoor air is purified to remove pollutants and then circulated without introduction of external air or heat exchange with external air, thereby having effects on decreasing cooling and heating loads and improving convenience of use.

In the smart air conditioner for reduction in fine dust and harmful gas according to the disclosure, the connection inner container body, the external chamber fan, the internal chamber fan, the external-air mix control damper, the internal-air control damper, etc. are additionally provided, thereby having effects on reducing energy costs and improving convenience of use through the internal-air purification mode for removing fine dust from internal air without introduction of external air and the air mixing ventilation mode for partially performing ventilation according to conditions of internal air and external air.

BEST MODE

Below, embodiments of the disclosure will be described in detail with reference to the accompanying drawings of FIGS. 1 to 20c, in which like numerals refer to like elements throughout FIG. 1 to FIG. 20c.

Meanwhile, detailed descriptions about the elements and their operations and effects, which will be easily understood based on general technology by a person having an ordinary skill in the art, in the accompanying drawings will be simplified or omitted. Further, the disclosure is characterized in a smart air conditioner for reduction in fine dust and harmful gas, and thus only relevant parts will be illustrated and described while simplifying or omitting the other parts.

Figure 1:
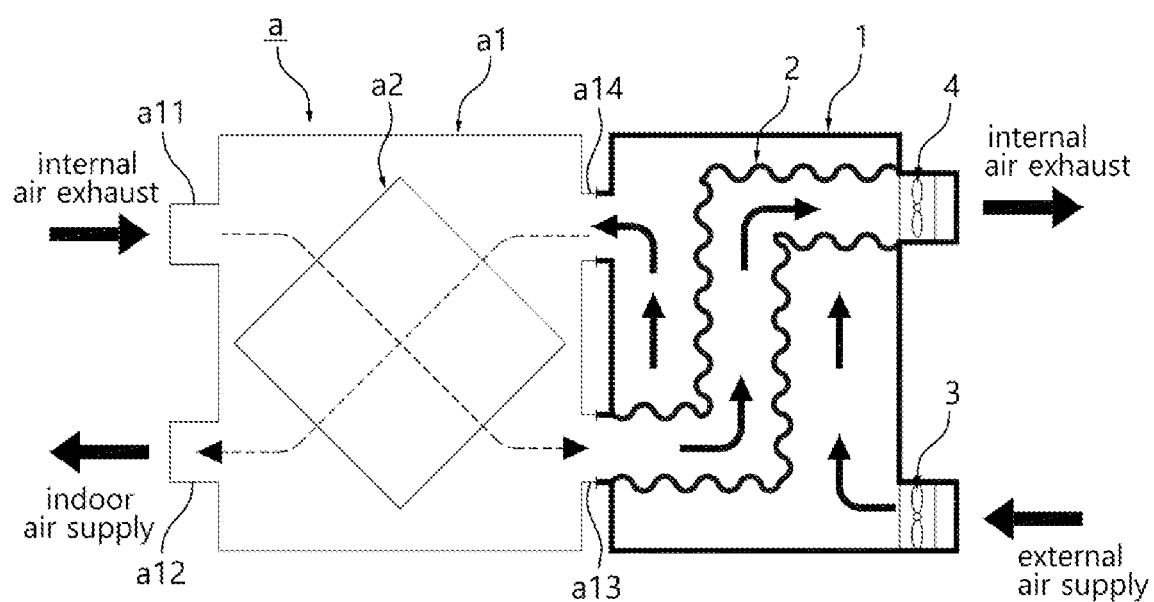
FIG. 1 is a schematic view for describing technical concept of a smart air conditioner for reduction in fine dust and harmful gas according to the disclosure.

FIG. 1 is a schematic view for describing technical concept of a smart air conditioner for reduction in fine dust and harmful gas according to the disclosure, in which major elements are simplified.

Referring to FIG. 1, the smart air conditioner for reduction in fine dust and harmful gas according to the disclosure refers to an apparatus connected to a ventilating apparatus typically called a total heat exchanging machine, which is characterized in that a previous heat exchanging process is performed before external air is introduced into the ventilating apparatus a.

The smart air conditioner for reduction in fine dust and harmful gas according to the disclosure includes an external chamber 1, an internal chamber 2, an external chamber damper 3, and an internal chamber damper 4.

The ventilating apparatus a includes a ventilating apparatus main body a1 formed with an internal accommodating space and provided with an indoor-side air exhaust port a11, an indoor-side air supply port a12, an outdoor-side air exhaust port a13 and an outdoor-side air supply port a14, and a total heat exchanger a2 installed inside the ventilating apparatus main body a1.

The total heat exchanger a2 is also called a total heat exchanging element, and generally employs an element in which many layers of members provided in the form of a corrugated cardboard made of paper or the like and having folded holes are laid one upon another, and cross-coupled at an angle of 90 degrees.

Further, detailed configurations of the ventilating apparatus main body a1 and the total heat exchanger a2 provided in the ventilating apparatus a are well known in an air conditioning art, and therefore detailed descriptions thereof will be omitted.

The external chamber 1 includes a first side coupled to and communicating with the ventilating apparatus a, and a second side communicating with the outside, and allows external air to flow in, stay and move to thereby exchange heat with internal air moving through the internal chamber 2.

The internal chamber 2 refers to an element arranged to pass through the inside of the external chamber 1 so that the internal air can move to the outside, and includes a first side coupled to and communicating with the ventilating apparatus a, and a second side connected to and communicating with the outside.

The external chamber damper 3 refers to an opening/closing means installed in the external chamber 1 and controlling airflow, and the internal chamber damper 4 refers to an opening/closing means installed in the internal chamber 2 and controlling air flow.

Further, the hole of the first side communicating with the ventilating apparatus a and the hole of the second side communicating with the outside are disposed to diagonally face each other in the internal chamber 2, and the hole of the first side communicating with the ventilating apparatus and the hole of the second side communicating with the outside are disposed to diagonally face each other in the external chamber 1. As shown in FIG. 1, the hole of the external chamber 1 and the hole of the internal chamber 2 may be positioned in misaligned directions.

Meanwhile, the smart air conditioner for reduction in fine dust and harmful gas according to the disclosure operates in brief as follows. When an air supply fan (not shown) and an air exhaust fan (not shown) provided in the ventilating apparatus a operates in the state that the external chamber damper 3 and the internal chamber damper 4 are opened, internal air is as shown in FIG. 1 introduced into the indoor-side air exhaust port a11 and discharged to the outdoor-side air exhaust port a13 via the total heat exchanger a2.

Further, the internal air discharged to the outdoor-side air exhaust port a13 of the ventilating apparatus a is discharged to the outside via the internal chamber 2, and the external air introduced into the external chamber 1 moves via the inside of the external chamber 1 but primarily exchanges heat with the internal air flowing through the inside of the internal chamber 2.

Like this, the external air subjected to the primary heat exchange is introduced into the outdoor-side air supply port a14 and then subjected to secondary heat exchange while being introduced into the indoor-side air supply port a12 after passing through the total heat exchanger a2.

As described above, the smart air conditioner for reduction in fine dust and harmful gas according to the disclosure previously performs the primary heat exchanging process based on waste heat of the internal air passed through the total heat exchanger a2 before the external air is introduced into the ventilating apparatus a and subjected to the heat exchange like a conventional case.

Thus, it is possible to solve problems of failing to work properly or malfunctioning as clogging-up or the like is caused by condensation or ice formation due to sharp temperature difference from the ventilating apparatus main body a1 or the total heat exchanger a2 when the external air of low temperature comes in in winter. Further, the waste heat of the internal air used for the heat exchange in the total heat exchanger a2 is subjected once more to the heat exchange, thereby decreasing the cooling and heating loads and thus reducing the energy costs.

Figure 2:
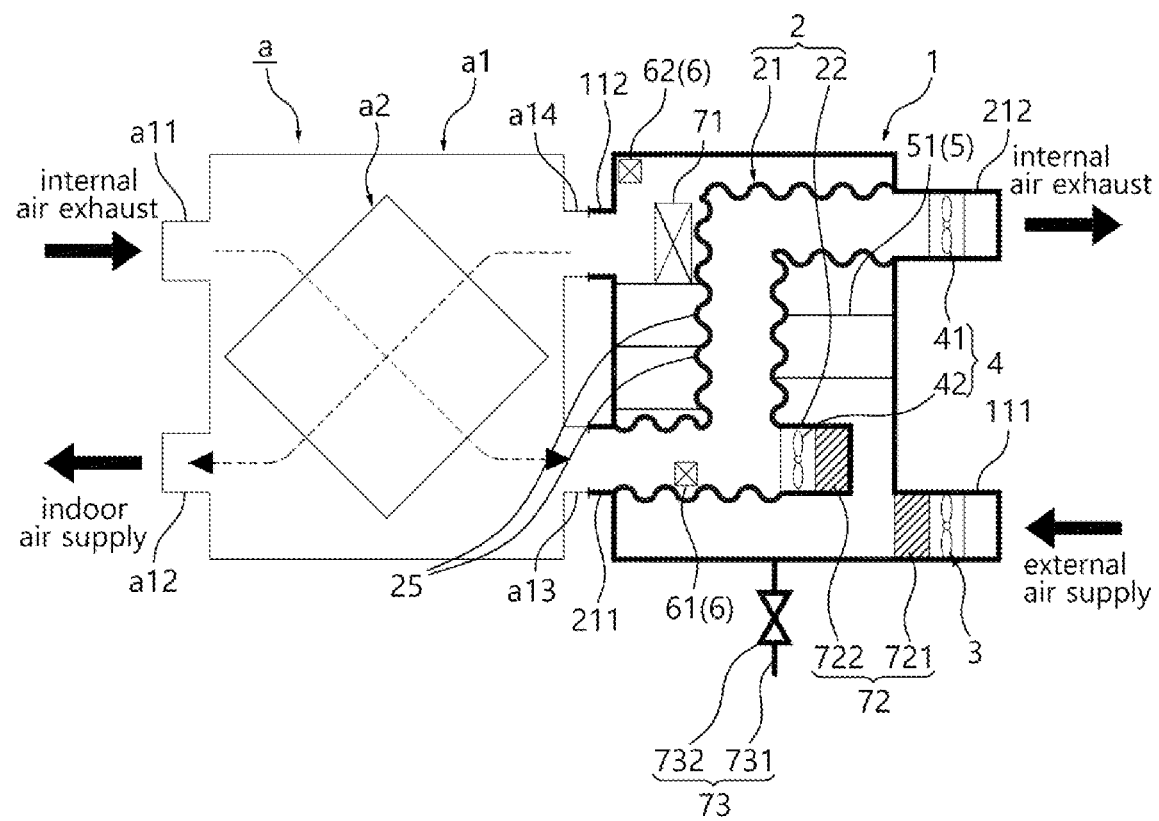
FIG. 2 is a schematic view for describing a smart air conditioner for reduction in fine dust and harmful gas according to a first embodiment of the disclosure.
Figure 3:
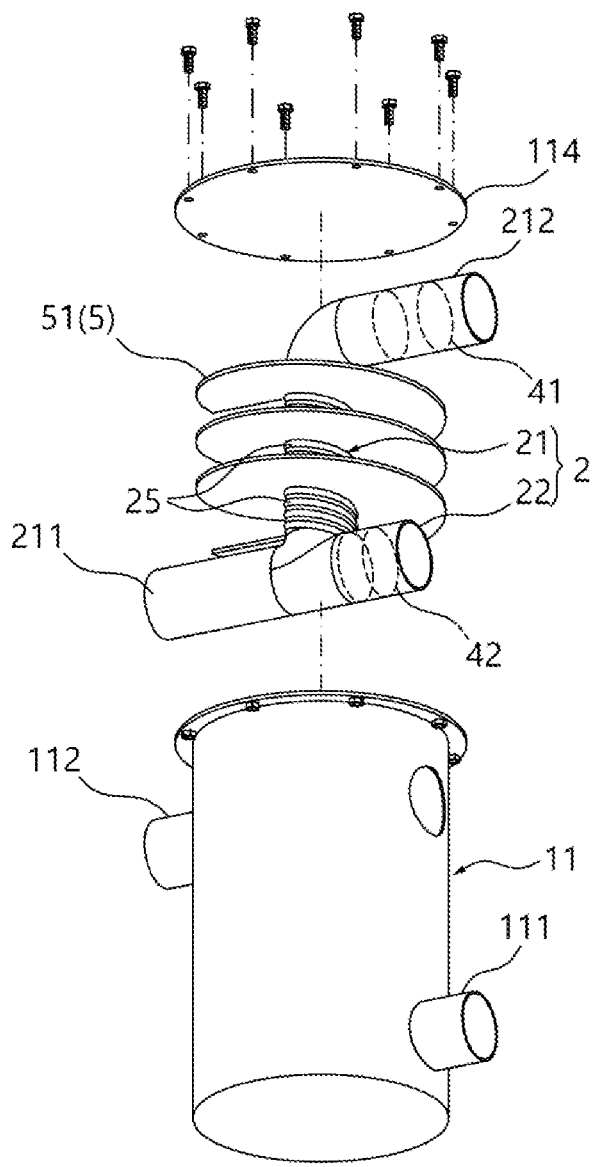
FIG. 3 is an exploded perspective view for describing an external chamber and an internal chamber in the smart air conditioner for reduction in fine dust and harmful gas according to the first embodiment of the disclosure.
Figure 4A:
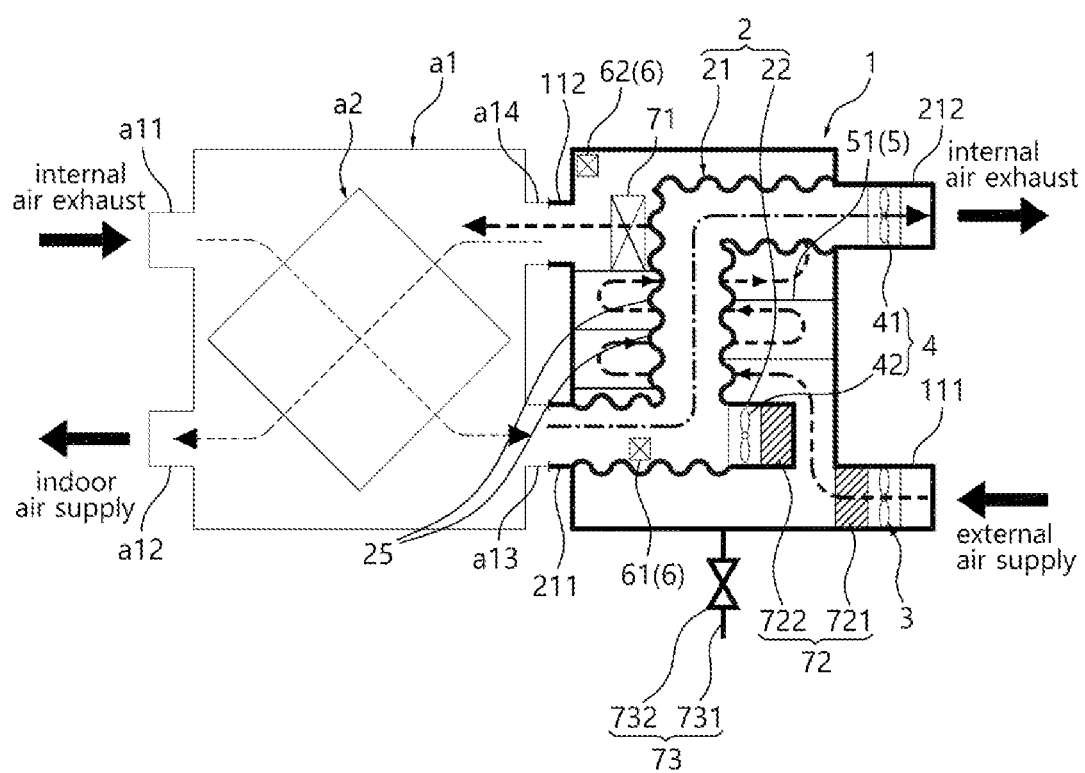
FIGS. 4a and 4b are views for describing operations of the smart air conditioner for reduction in fine dust and harmful gas according to the first embodiment of the disclosure.
Figure 4B:
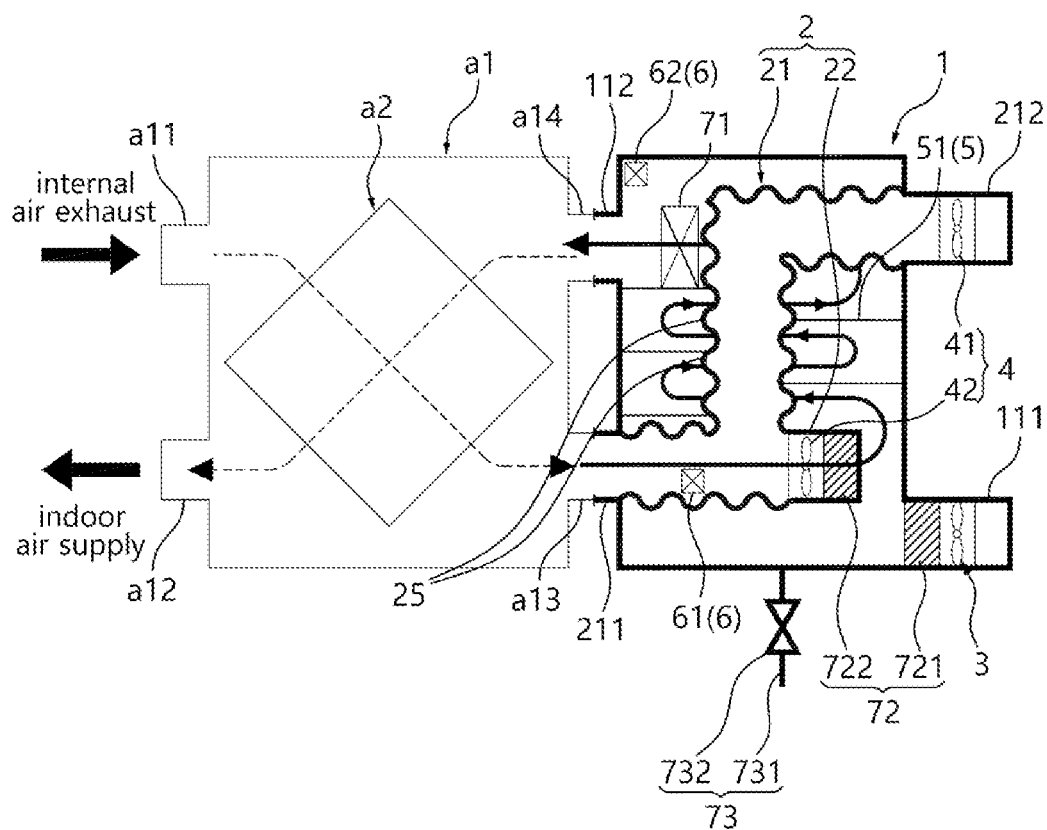

FIG. 2 is a schematic view for describing a smart air conditioner for reduction in fine dust and harmful gas according to a first embodiment of the disclosure, FIG. 3 is an exploded perspective view for describing an external chamber and an internal chamber in the smart air conditioner for reduction in fine dust and harmful gas according to the first embodiment of the disclosure, and FIGS. 4a and 4b are views for describing operations of the smart air conditioner for reduction in fine dust and harmful gas according to the first embodiment of the disclosure, in which FIGS. 2, 4a and 4b illustrate simplified main elements.

Referring to FIGS. 2 to 4b, the smart air conditioner for reduction in fine dust and harmful gas according to the first embodiment of the disclosure includes the external chamber 1 having the first side coupled to and communicating with the ventilating apparatus a and the second side communicating with the outside, the internal chamber 2 disposed to pass through the inside of the external chamber 1 and having the first side coupled to and communicating with the ventilating apparatus a and the second side communicating with the outside, the external chamber damper 3 installed in the external chamber 1 and controlling air flow, and the internal chamber damper 4 installed in the internal chamber 2 and controlling air flow, in which the external chamber 1 includes an outer container body 11, the internal chamber 2 includes an inner container body 21, and the inner container body 21 is formed with a branch 22 communicating with the inner space of the external chamber 1.

The outer container body 11 forming the external chamber 1 refers to an element in which a chamber external-air exhauster 112 is connected to an air supply port a14 (i.e. an outdoor-side air supply port) so as to supply the external air introduced into a chamber external-air introducer 111, and is illustrated as a cylindrical shape in FIG. 3 by way of example but may also be shaped like a hexahedron or the like. Here, the outer container body 11 is formed with an opening on the top through which the internal chamber 2 is inserted, and provided with a finishing flange 114 shaped like a disc and coupled to seal up the opening after accommodating the internal chamber 2.

The inner container body 21 forming the internal chamber 2 refers to an element in which a chamber internal-air introducer 211 is connected to an air exhaust port a13 (i.e. an outdoor-side air exhaust port) and a chamber internal-air exhauster 212 is provided to communicate with the outside of the outer container body 11, and is illustrated as a cylindrical duct in FIG. 3 by way of example but may also be shaped like a quadrangular duct or the like.

Further, the internal chamber 2 is formed with the branch 22 communicating with the inner space of the external chamber 1, and has the holes formed at the first side to communicate with the ventilating apparatus a and at the second side to communicate with the outside, in which the holes are disposed in diagonal directions to secure enough stay time.

The internal chamber damper 4, as simplified and illustrated in FIGS. 2 and 3, includes an internal-air exhaust-control two-way damper 41 installed in the chamber internal-air exhauster 212, and an internal-air circulation-control two-way damper 42 installed in the branch 22.

The external chamber damper 3 includes an external-air inflow-control two-way damper installed in the chamber external-air introducer 111.

The two-way damper used for the internal chamber damper 4 and the external chamber damper 3 refers to an opening/closing unit (not shown) provided in a damper body (not shown) to open and close two channels is, which is an opening/closing means widely used for controlling air flow in an air conditioning technical field and thus detailed descriptions thereof will be omitted.

Meanwhile, the smart air conditioner for reduction in fine dust and harmful gas according to the first embodiment of the disclosure includes a heat conductor 25 formed to perform heat exchange based on temperature difference during flow of air moving between the external chamber 1 and the internal chamber 2.

The heat conductor 25 may be formed in at least one of the internal chamber 2 and the external chamber 1 without limitations as long as it has a structure of increasing a heat transfer area. However, the heat conductor 25 in this embodiment is formed in the internal chamber 2 as shown in FIG. 2.

In more detail, the heat conductor 25 may be provided in such a manner that a plurality of radiation fins or the like heat transfer member (not shown) is installed in the internal chamber 2, but the heat conductor 25 in this embodiment includes a wrinkled portion formed in the internal chamber 2 to increase a surface area for heat transfer as shown in FIG. 3.

Further, the smart air conditioner for reduction in fine dust and harmful gas according to the first embodiment of the disclosure includes an air flowing guide 5 installed to form turbulence and increase stay time of air flowing through the external chamber 1.

The air flowing guide 5 includes a spiral guiding member 51 arranged between the external chamber 1 and the internal chamber 2. For example, the spiral guiding member 51 includes a band-type spiral plate formed to be spirally wound between the outer circumferential surface of the external chamber 1 and the inner surface of the internal chamber 2 as shown in FIG. 3.

Meanwhile, the air flowing guide 5 may include not only the shape shown in FIG. 3 but also a plurality of air guide plates (not shown), in which plate members are alternately disposed to have a multi-layered structure for forming a zigzag channel between the external chamber 1 and the internal chamber 2.

Further, the smart air conditioner for reduction in fine dust and harmful gas according to the first embodiment of the disclosure may include a condition sensing means 6 installed in at least one of the ventilating apparatus a, the external chamber 1 and the internal chamber 2, and a controller (not shown) for controlling operations of the external chamber damper 3, the internal chamber damper 4, the ventilating apparatus a, etc.

The condition sensing means 6 refers to a means for detecting conditions of air, such as temperature, humidity, carbon dioxide concentration, find dust density, etc. in the ventilating apparatus a, the external chamber 1 and the internal chamber 2, and may include at least one selected among a pressure sensing means for sensing pressure like a pressure sensor, a temperature sensing means for sensing temperature like a temperature sensor, a humidity sensing means for sensing humidity, an electro-conductivity sensing means for sensing electro-conductivity and usually called an EC sensor, a gas sensing means for sensing concentration of carbon dioxide or the like harmful gas, a flowrate measurement means for measuring a flowrate of airs, and a fine-dust concentration-measurement means for sensing fine dust such as yellow dust, etc.

For example, the condition sensing means 6, as shown in FIG. 2, includes a first condition detection module 61 where the temperature sensing means, the humidity sensing means, the gas sensing means, and the fine-dust concentration-measurement means are installed in the internal chamber 2 as a single unit module for detecting the conditions of the internal air, and a second condition detection module 62 where the pressure sensing means, the temperature sensing means and the fine-dust concentration-measurement means are installed in the external chamber 1 as a single unit module for detecting the conditions of the external air.

The smart air conditioner for reduction in fine dust and harmful gas according to the first embodiment of the disclosure is provided with a heating means 71 installed inside the external chamber 1 and raising temperature of air.

The heating means 71 refers to an element for providing an auxiliary heat source to raise temperature when the temperature of external air does not reach desired temperature, and may include an electric heater or the like to generate heat when it is powered on.

Meanwhile, the smart air conditioner for reduction in fine dust and harmful gas according to the first embodiment of the disclosure includes a filtering means 72 for purifying air.

The filtering means 72 refers to an element for removing foreign materials from external air or internal air, and includes an external-air purification filtering means 721 installed in the chamber external-air introducer 111 of the external chamber 1, and an internal-air purification filtering means 722 installed in the branch 22 of the internal chamber 2.

Further, the filtering means 72 may be provided as a filter assembly for effectively removing foreign materials from air. Here, the filter assembly is not limited to its structure or shape as long as it is excellent in filtering the foreign materials, but may have a structure including a high efficiency particulate air (HEPA) filter, i.e. an antimicrobial filter functioning to filter even germs as well as the yellow dust and the like fine dust.

The smart air conditioner for reduction in fine dust and harmful gas according to the first embodiment of the disclosure includes a water remover 73 for removing produced water.

The water remover 73 refers to an element for removing water produced inside the external chamber 1 or the internal chamber 2, and the water remover 73 according to this embodiment includes the drain line 731 formed in the external chamber 1 as shown in FIG. 2.

Further, the water remover 73 may include a control valve 732 installed in the drain line 731 to more effectively perform an operation of removing water and opened and closed under control of the controller (not shown), and a drain-line heat-generation means (not shown) such as a hot wire installed in the drain line 731 in order to prevent water from being frozen in winter even though it is not specifically illustrated in the drawings.

Further, the water remover 73 may include a dehumidifier module (not shown) to more effectively remove water even though it is not specifically illustrated in the drawings. Here, the dehumidifier module may select and employ a publicly known dehumidifying module including a thermoelectric module or the like that performs dehumidification when it is powered on.

Besides, the water remover 73 may include a hydrophobic coating layer (not shown) coated with a hydrophobic material on the outer surface of the internal chamber 2 and the inner surface of the external chamber 1 so that water can be formed and quickly fall.

Below, the operations of the smart air conditioner for reduction in fine dust and harmful gas according to the first embodiment of the disclosure will be described in brief.

FIG. 4a illustrates a view for describing an operation state at a point in time when ventilation is needed as indoor fine dust or carbon dioxide is increased in concentration. As shown therein, in a ventilation mode where a ventilation process is performed, under control of the controller, the internal-air exhaust-control two-way damper 41 is opened to discharge the internal air to the outside, the internal-air circulation-control two-way damper 42 installed in the branch 22 is closed and the external chamber damper 3 is opened to make it possible to introduce the external air therein.

In this state, when the air supply fan (not shown) and the air exhaust fan (not shown) provided in the ventilating apparatus a operate, the internal air is introduced into the indoor-side air exhaust port a11, discharged to the outdoor-side air exhaust port a13 via the total heat exchanger a2, and discharged to the outside via the internal chamber 2. At the same time, the external air introduced into the external chamber 1 moves along the inner space of the external chamber 1 and primarily exchanges heat with the internal air moving via the inside of the internal chamber 2. In this case, the heat exchange area of the heat conductor 25 formed in the internal chamber 2 is increased, and the stay time of the air is increased as swirling flow is generated and turbulence is formed while the air passes through the air flowing guide 5 formed having a spiral structure, thereby more effectively performing the heat exchange between the internal air and the external air.

As described above, the secondary heat exchange occurs while the external air subjected to the primary heat exchange is introduced into the outdoor-side air supply port a14, passes through the total heat exchanger a2 and is introduced into the indoor-side air supply port a12.

As described above, the smart air conditioner for reduction in fine dust and harmful gas according to the disclosure reduces energy costs by decreasing cooling and heating loads because the primary previous heat exchanging process is performed by the waste heat of the internal air discharged passing through the total heat exchanger a2 before the external air is introduced into the ventilating apparatus a and subjected to the conventional heat exchange, and prevents malfunction due to icemaking in the ventilation apparatus in winter.

FIG. 4b illustrates a view for showing an operation state at a point in time when ventilation is not necessary because concentration of carbon dioxide contained in indoor air is proper but air purification for removing fine dust is needed because the fine dust is increased. In an air purification mode as shown in FIG. 4b, under control of the controller, the internal-air exhaust-control two-way damper 41 is closed to prevent the internal air from being discharged to the outside, the internal-air circulation-control two-way damper 42 installed in the branch 22 is opened and the external chamber damper 3 is closed to block inflow of external air.

In this state, when the air supply fan (not shown) and the air exhaust fan (not shown) provided in the ventilating apparatus a operate, the internal air is discharged to the outdoor-side air exhaust port a13, and discharged into the inner space of the external chamber 1 through the branch 22 immediately after being introduced into the internal chamber 2. In this case, the internal air passes through an internal-air purification filtering means 722 installed in the branch 22, thereby carrying out the purification process of removing the fine dust from the internal air.

Then, the internal air is introduced into the outdoor-side air supply port a14 via the air flowing guide 5, and introduced into the indoor-side air supply port a12 via the total heat exchanger a2, thereby returning to the indoor space.

Meanwhile, the foregoing process of the air purification mode may be carried out to control the conditions of the indoor air by various methods of making the external chamber damper 3 be not fully closed but opened to some extent based on a signal detected by the condition sensing means 6 and introducing the external air, adjusting an opened/closed degree of the internal-air circulation-control two-way damper 42, etc.

As described above, the smart air conditioner for reduction in fine dust and harmful gas according to the disclosure reduces energy costs as cooling and heating loads are decreased because the cooled or heated internal air is not wastefully discharged to the outside for ventilation and only the purification process is performed by a method of circulating indoor air after removing pollutants from the indoor air without introduction of external air or heat exchange with the external air.

Figure 5:
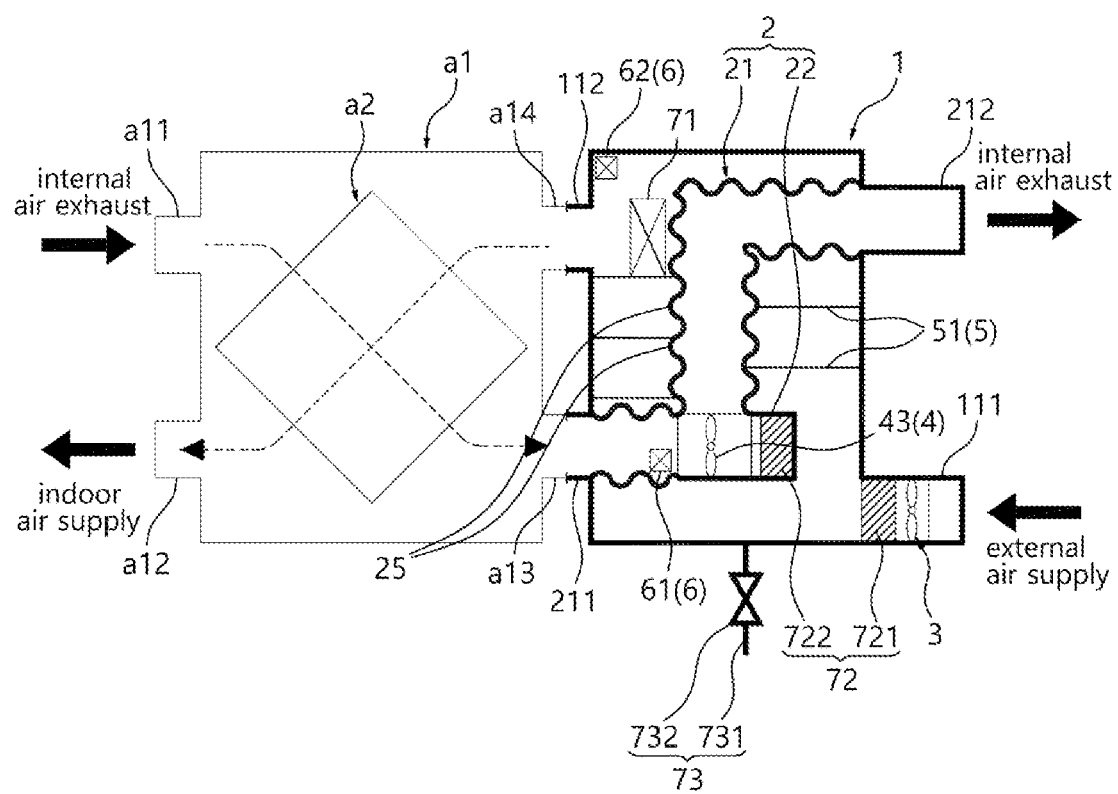
FIG. 5 is a schematic view for describing an alternative example of the smart air conditioner for reduction in fine dust and harmful gas according to the first embodiment of the disclosure.
Figure 6A:
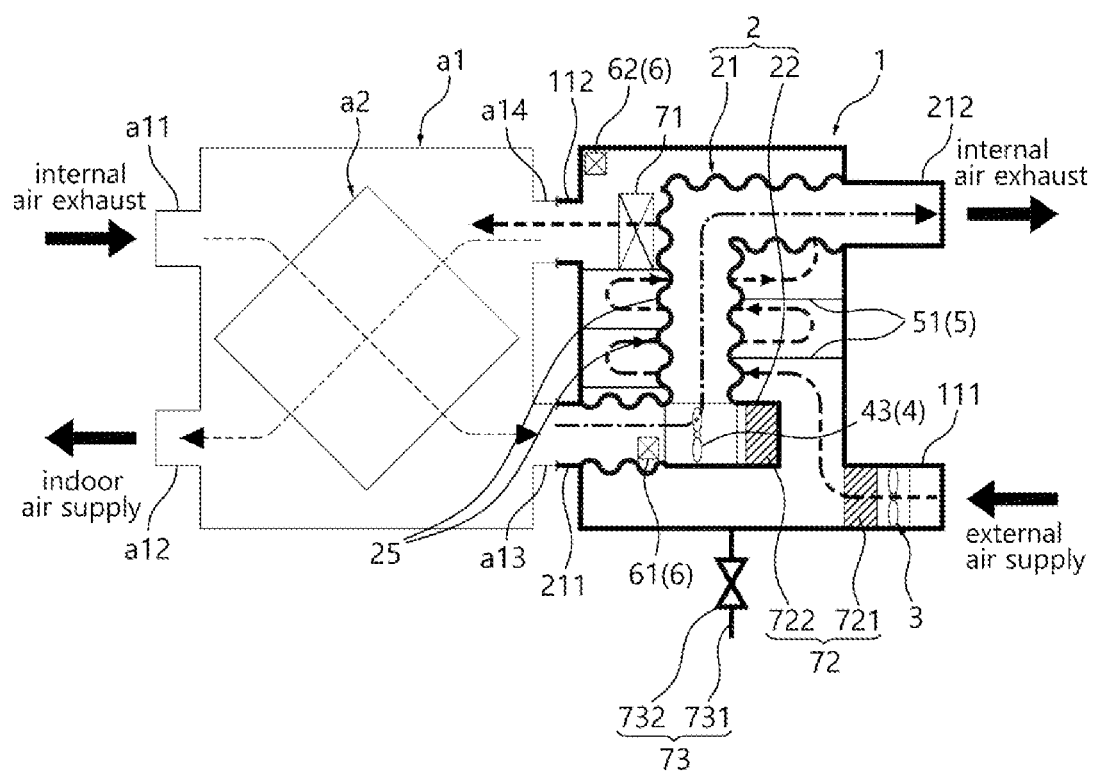
FIGS. 6a and 6b are views for describing operations based on the alternative example of the smart air conditioner for reduction in fine dust and harmful gas according to the first embodiment of the disclosure.
Figure 6B:
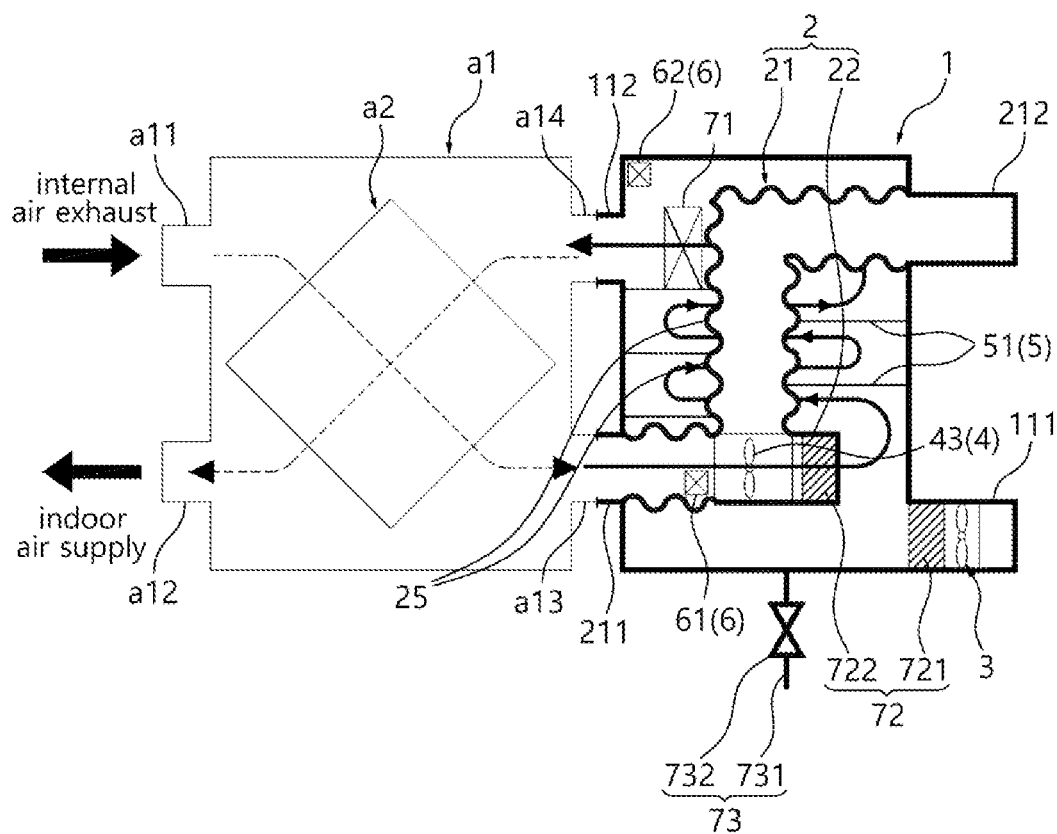

FIG. 5 is a schematic view for describing an alternative example of the smart air conditioner for reduction in fine dust and harmful gas according to the first embodiment of the disclosure, and FIGS. 6a and 6b are views for describing operations based on the alternative example of the smart air conditioner for reduction in fine dust and harmful gas according to the first embodiment of the disclosure.

Referring to FIGS. 5 to 6b, the smart air conditioner for reduction in fine dust and harmful gas according to an alternative to the first embodiment of the disclosure includes an external chamber 1 formed by an outer container body 11, an internal chamber 2 formed by an inner container body 21 having a branch 22 communicating with the inner space of the external chamber 1, an external chamber damper 3 installed in the external chamber 1 and controlling flow of air, and an internal chamber damper 4 installed in the internal chamber 2 and controlling flow of air, in which the internal chamber damper 4 includes a three-way damper 43 installed in the branch 22 to control internal-air exhaust and internal-air circulation.

Here, the three-way damper 43 refers to a damper in which air flows in directions of two channels among three channels formed inside a damper body (not shown) and the air flow is blocked in a direction of the other channel. When such a three-way damper 43 is used, effects on reducing total production costs are expected because the number of internal chamber dampers is decreased and the structure of air conditioner is simplified as compared with that of FIG. 2.

Further, the internal chamber damper 4 may employ three-way valves configured to open and close three channels as a valve besides the three-way damper 43.

The external chamber damper 3 includes a two-way damper installed in the chamber external-air introducer 111 and controlling introduction of external air.

Meanwhile, the smart air conditioner for reduction in fine dust and harmful gas according to the alternative to the first embodiment of the disclosure may perform the ventilation mode as shown in FIG. 6a and perform the air purification mode as shown in FIG. 6b like the foregoing operations of the first embodiment, and therefore descriptions about the total operations will be omitted and only the distinctive opening and closing operations of the external and internal chamber dampers 3 and 4 will be described in brief.

The ventilation mode shown in FIG. 6a is carried out under control of the controller after the three-way damper 43 operates to open the channel in the direction of the chamber internal-air exhauster 212 so that the internal air can be discharged to the outside, close the channel in the direction of the branch 22 so that the internal air can be prevented from being discharged into the inner space of the external chamber 1, and open the external chamber damper 3 so that the introduction of the external air can be allowed.

The air purification mode shown in FIG. 6b is carried out under control of the controller after the three-way damper 43 operates to close the channel in the direction of the chamber internal-air exhauster 212 so that the internal air can be prevented from being discharged to the outside, open the channel in the direction of the branch 22 so that the internal air can be discharged into the inner space of the external chamber 1, and close the external chamber damper 3 so that the introduction of the external air can be blocked.

Mode for Invention

Below, other embodiments according to the disclosure will be described, focusing on different elements while omitting detailed descriptions about elements similar to the elements shown in the foregoing first embodiment. Further, the following embodiments may selectively use an employable structure among the elements shown in the first embodiment or the elements shown in other embodiments, and detailed description or illustration thereof will be omitted.

Figure 7:
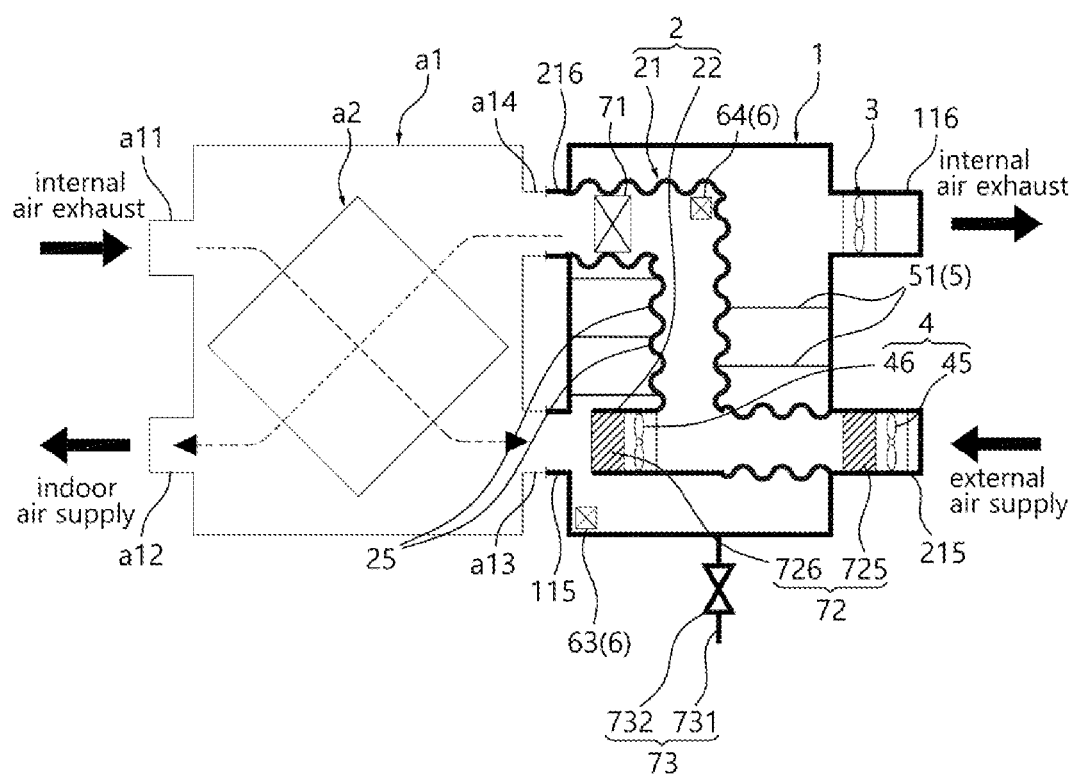
FIG. 7 is a schematic view for describing a smart air conditioner for reduction in fine dust and harmful gas according to a second embodiment of the disclosure.
Figure 8A:
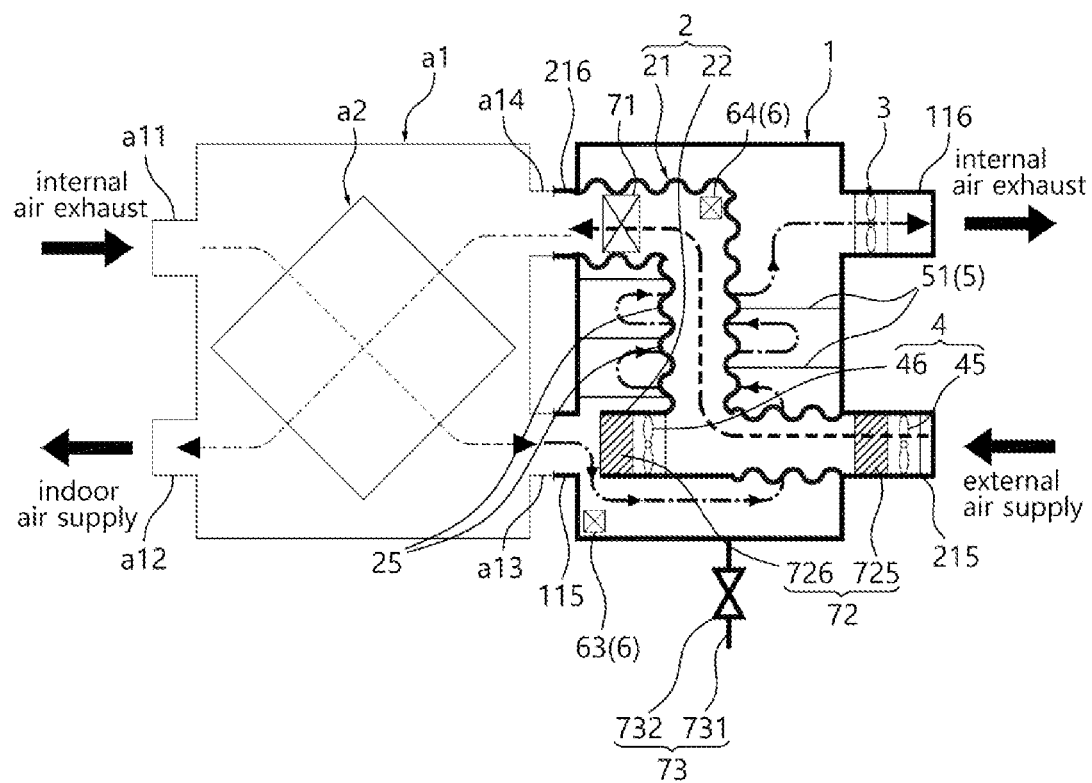
FIGS. 8a and 8b are views for describing operations of the smart air conditioner for reduction in fine dust and harmful gas according to the second embodiment of the disclosure.
Figure 8B:
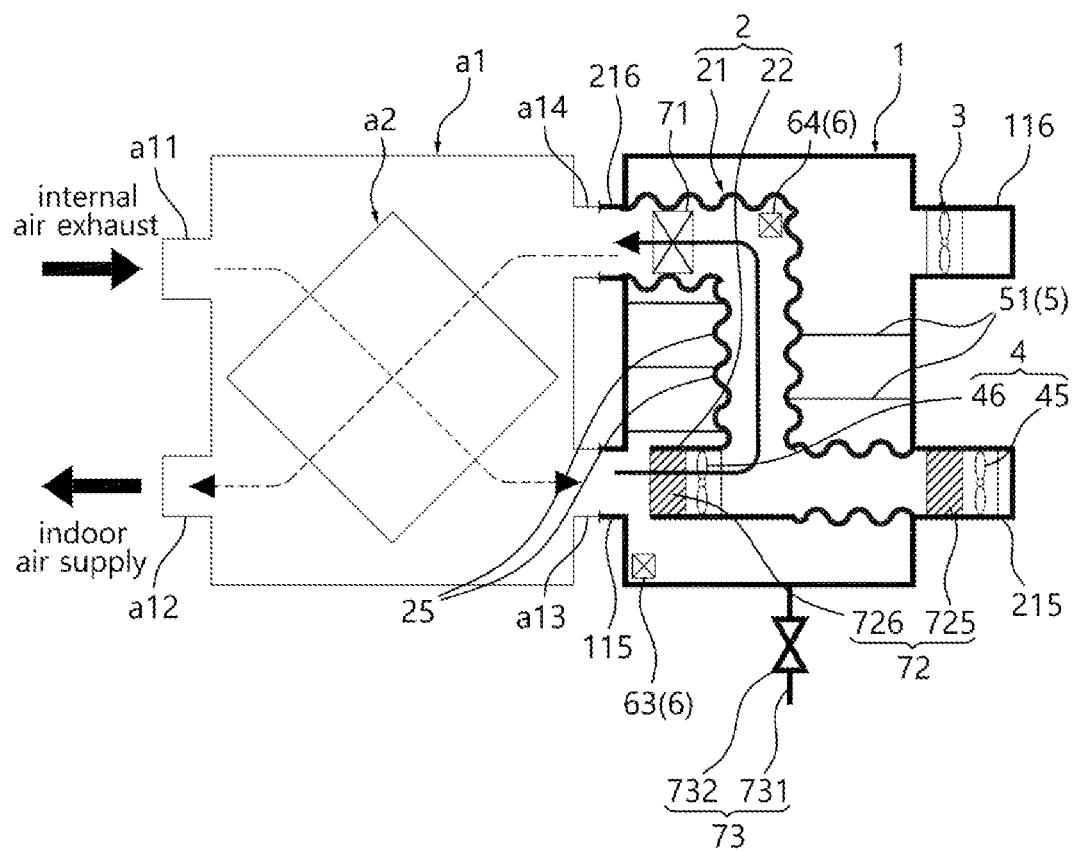

FIG. 7 is a schematic view for describing a smart air conditioner for reduction in fine dust and harmful gas according to a second embodiment of the disclosure, and FIGS. 8a and 8b are views for describing operations of the smart air conditioner for reduction in fine dust and harmful gas according to the second embodiment of the disclosure, in which main elements are simplified and illustrated in FIGS. 7 to 8b.

Referring to FIGS. 7 to 8b, the smart air conditioner for reduction in fine dust and harmful gas according to the second embodiment of the disclosure includes an external chamber 1, an internal chamber 2, an external chamber damper 3, and an internal chamber damper 4 like the foregoing first embodiment, but is different from the first embodiment in that the external chamber 1 serves as a chamber through which internal air moves, and the internal chamber 2 serves as a chamber through which the external air moves.

In more detail, the external chamber 1 includes an outer container body 11 formed with a chamber internal-air introducer 115 communicating with the air exhaust port (the outdoor-side air exhaust port a13) of the ventilating apparatus a, and a chamber internal-air exhauster 116 from which the internal air introduced into the chamber internal-air introducer 115 is discharged.

The internal chamber 2 includes an inner container body 21 formed with a chamber external-air introducer 215 communicating with the outside of the outer container body 11 and a chamber external-air introducer 216 connected to the air supply port (the outdoor-side air supply port a14), and the inner container body 21 is formed with the branch 22 to communicate with the inner space of the external chamber 1.

The external chamber damper 3 is installed in the chamber internal-air exhauster 116 and includes an internal-air exhaust-control two-way damper for controlling the inner air to be discharged to the outside.

The internal chamber damper 4 includes an external-air inflow-control two-way damper 45 installed in the chamber external-air introducer 215 and controlling the introduction of the external air, and an internal-air circulation-control two-way damper 46 installed in the branch 22 and controlling the circulation of the internal air.

A condition sensing means 6 as shown in FIG. 7, includes a first condition detection module 63 where the temperature sensing means, the humidity sensing means, the gas sensing means, and the fine-dust concentration-measurement means are installed in the external chamber 1 as a single unit module for detecting the conditions of the internal air, and a second condition detection module 64 where the pressure sensing means, the temperature sensing means and the fine-dust concentration-measurement means are installed in the internal chamber 2 as a single unit module for detecting the conditions of the external air.

Referring to FIG. 7, a heating means 71 is installed in the internal chamber 2 and serves to provide an auxiliary heat source when the temperature of the external air does not reach a desired temperature, and a filtering means 72 includes an external-air purification filtering means 725 installed in the chamber external-air introducer 215 of the internal chamber 2, and an internal-air purification filtering means 726 installed in the branch 22 of the internal chamber 2.

Meanwhile, the smart air conditioner for reduction in fine dust and harmful gas according to the second embodiment of the disclosure can perform the ventilation mode as shown in FIG. 8a and the air purification mode as shown in FIG. 8b like the operations of the foregoing first embodiment, and thus only difference will be described in brief omitting the full descriptions of the operations.

The ventilation mode shown in FIG. 8a is carried out under control of the controller after opening the external chamber damper 3 installed in the external chamber 1 so that the internal air can be discharged outward to the chamber internal-air exhauster 116, opening the external-air inflow-control two-way damper 45 so that the introduction of the external air can be allowed, and closing the internal-air circulation-control two-way damper 46 so that the external air can be introduced into the ventilating apparatus a through the chamber external-air introducer 216.

The air purification mode as shown in FIG. 8b is carried out under control of the controller after closing the external chamber damper 3 to block the channel in the direction toward the chamber internal-air exhauster 116 so that the internal air can be prevented from being discharged to the outside, closing the external-air inflow-control two-way damper 45 so that the introduction of the external air can be prevented, and opening the internal-air circulation-control two-way damper 46 so that the introduction of the internal air can be allowed, thereby purifying the internal air through the internal-air purification filtering means 726 and then returning the internal air to the inside of the ventilating apparatus a through the chamber external-air introducer 216.

Meanwhile, on the contrary to the foregoing first embodiment, the external air flows through the internal chamber 2, and the internal air flows into the external chamber 1, so that the internal air used as a heat exchange medium can pass through the externa chamber 1 relatively increased in a stay space and stay time, thereby improving a heat exchange efficiency of the external air flowing into the internal chamber 2.

Figure 9:
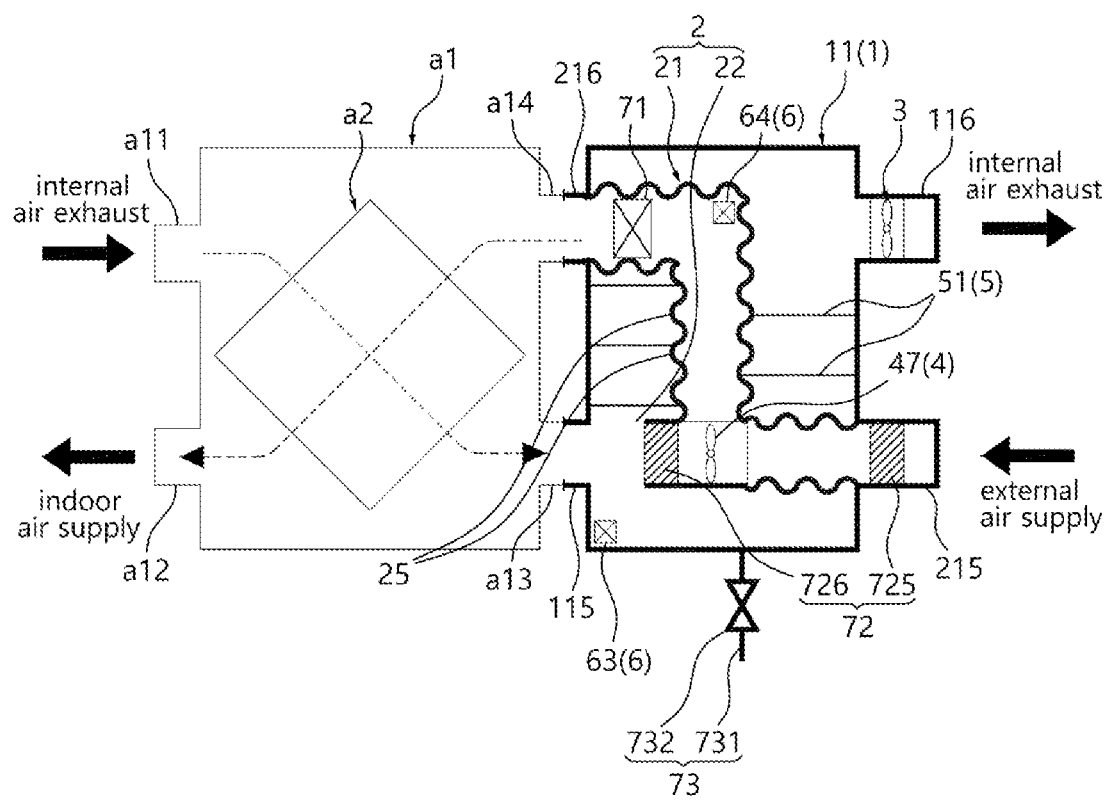
FIG. 9 is a schematic view for describing an alternative example of the smart air conditioner for reduction in fine dust and harmful gas according to the second embodiment of the disclosure.
Figure 10A:
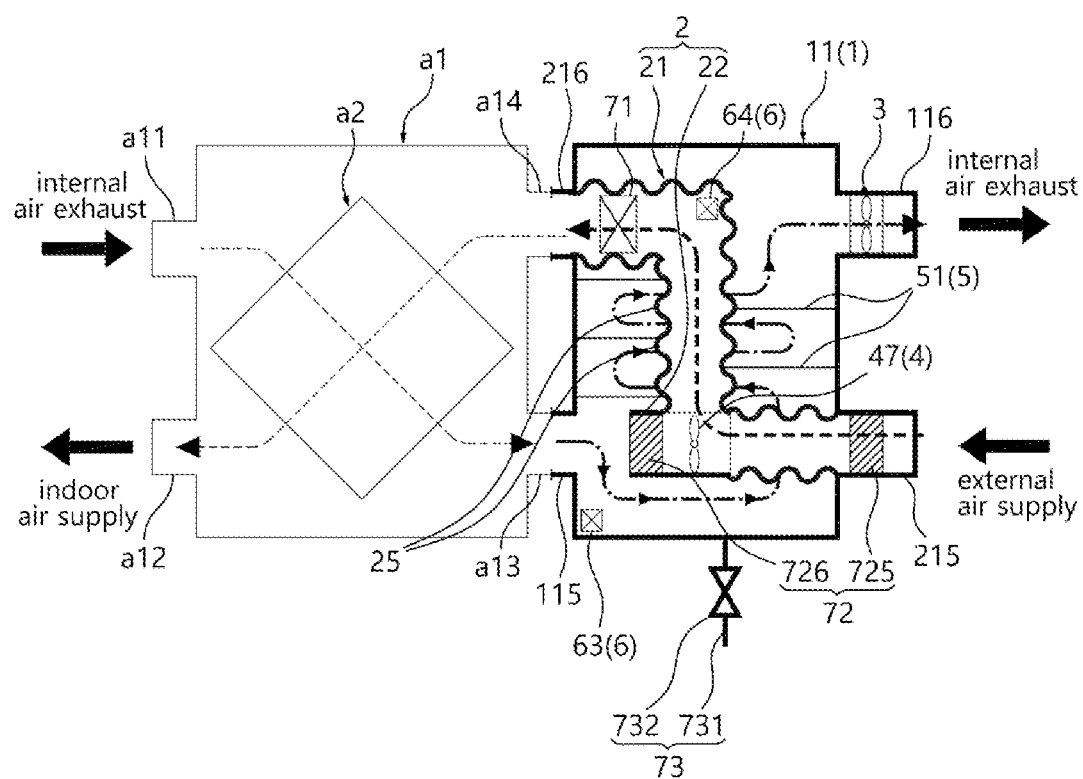
FIGS. 10a and 10b are views for describing operations based on the alternative example of the smart air conditioner for reduction in fine dust and harmful gas according to the second embodiment of the disclosure.
Figure 10B:
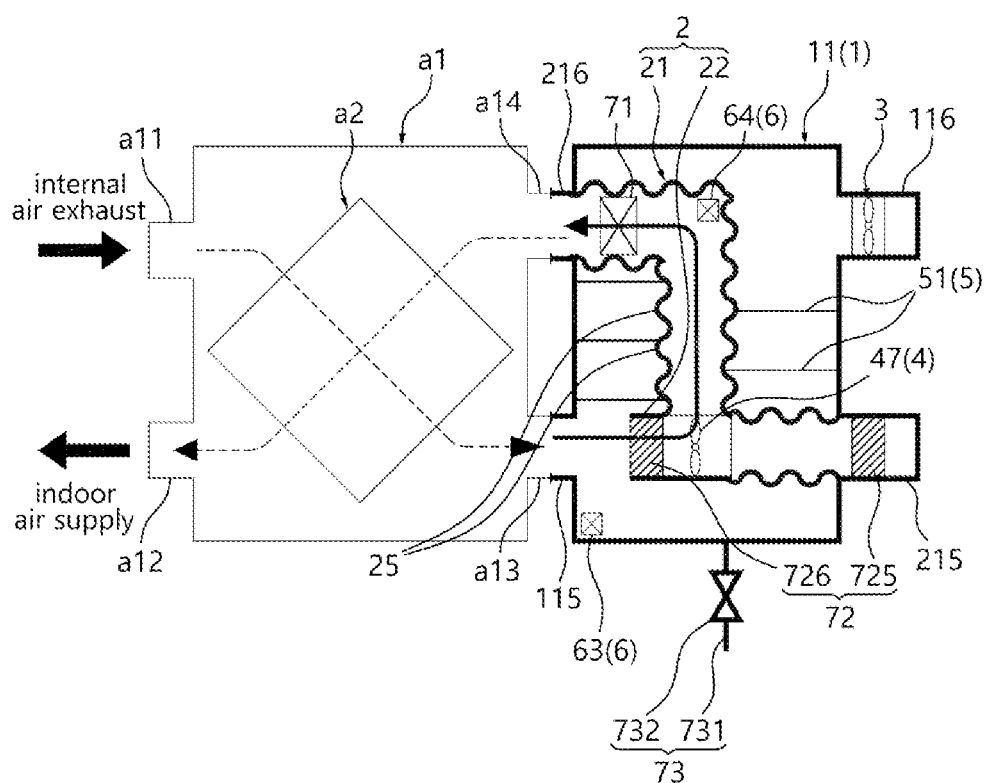

FIG. 9 is a schematic view for describing an alternative example of the smart air conditioner for reduction in fine dust and harmful gas according to the second embodiment of the disclosure, and FIGS. 10a and 10b are views for describing operations based on the alternative example of the smart air conditioner for reduction in fine dust and harmful gas according to the second embodiment of the disclosure.

Referring to FIGS. 9 to 10b, the smart air conditioner for reduction in fine dust and harmful gas according to an alternative to the second embodiment of the disclosure includes an external chamber 1, an internal chamber 2, an external chamber damper 3, and an internal chamber damper 4, and the external chamber 1 includes an outer container body 11 formed with a chamber internal-air exhauster 116 for discharging internal air introduced into a chamber internal-air introducer 115 communicating with the air exhaust port a13 of the ventilating apparatus, and the internal chamber 2 includes an inner container body 21 formed with a chamber external-air introducer 216 connected to the air supply port a14, and a chamber external-air introducer 215 communicating with the outside of the outer container body 11.

Meanwhile, the branch 22 is formed to communicate with the inner space of the external chamber 1, and the internal chamber damper 4 is configured as a single damper for a more compact and simpler structure.

To this end, the internal chamber damper 4 includes a three-way damper 47 installed in the branch 22 and controlling the introduction of the external air and the circulation of the internal air.

The external chamber damper 3 includes an internal-air exhaust-control two-way damper installed in the chamber internal-air exhauster 116 and controlling the discharge of the internal air.

The smart air conditioner for reduction in fine dust and harmful gas according to the alternative to the second embodiment of the disclosure can perform the ventilation mode as shown in FIG. 10a and the air purification mode as shown in FIG. 10b like the operations of the foregoing second embodiment, and thus only the different opening and closing operations of the external chamber damper 3 and the internal chamber damper 4 will be described in brief omitting the full descriptions of the operations.

The ventilation mode shown in FIG. 10a is carried out under control of the controller by operating the three-way damper 47 to close a channel so that the internal air introduced from the direction of the branch 22 can be blocked, open a channel in the direction of the chamber external-air introducer 215 and the chamber external-air introducer 216 so that the external air can be introduced into the inside of the ventilating apparatus a, and open the external chamber damper 3 so that the internal air can be discharged to the outside.

The air purification mode as shown in FIG. 10b is carried out under control of the controller by closing the external chamber damper 3 to prevent the internal air from being discharged, and operating the three-way damper 47 to close a channel in the chamber external-air introducer 215 so that the introduction of the external air can be blocked, and open a channel in the chamber external-air introducer 216 and the branch 22 so that the internal air can flow into the inside of the ventilating apparatus a via the internal chamber 2.

Figure 11:
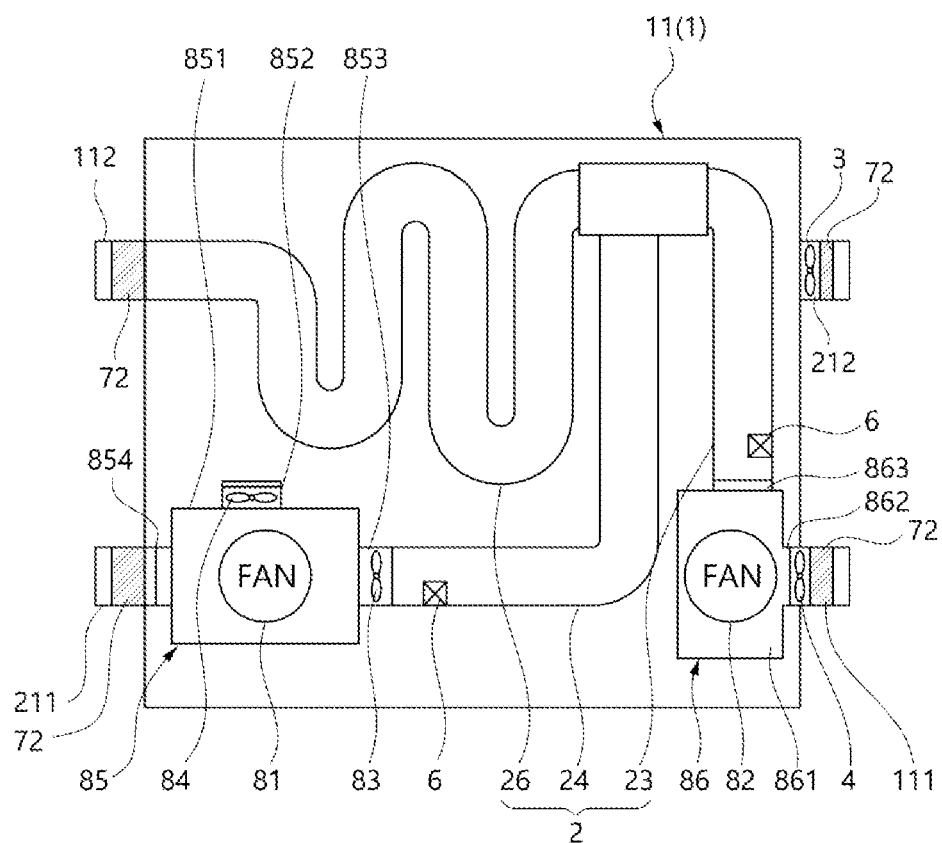
FIG. 11 is a schematic view for describing technical concept of a smart air conditioner for reduction in fine dust and harmful gas according to a third embodiment of the disclosure.

FIG. 11 is a schematic view for describing technical concept of a smart air conditioner for reduction in fine dust and harmful gas according to a third embodiment of the disclosure, in which main elements are simplified or illustrated with symbols.

Referring to FIG. 11, the smart air conditioner for reduction in fine dust and harmful gas according to the third embodiment of the disclosure refers to an apparatus for discharging indoor polluted air (hereinafter, referred to as internal air or indoor air) and introducing outdoor air (hereinafter, referred to as external air), which is characterized in previously exchanging heat with the internal air before introducing the external air therein.

The smart air conditioner for reduction in fine dust and harmful gas according to the third embodiment of the disclosure includes an external chamber 1, an internal chamber 2, an external chamber damper 3, an internal chamber damper 4, an external chamber fan 81 and an internal chamber fan 82.

The external chamber 1 has a first side coupled to communicate with the inside and a second side coupled to communicate with the outside, so that the internal air staying and flowing in its inner space can exchange heat with the external air flowing through the internal chamber 2.

Further, the external chamber 1 includes an outer container body 11 formed with a chamber internal-air introducer 211 through which the internal air is introduced, a chamber internal-air exhauster 212 through which the internal air is discharged, a chamber external-air introducer 111 through which the external air is introduced, and a chamber external-air exhauster 112 through which the external air is discharged.

Here, the outer container body 11 is shaped like a hexahedron, and formed to have a low height as compared with its width or length in consideration of interference with the concrete construction or ceiling finish material of the structures when installed.

The internal chamber 2 is disposed to pass through the inside of the external chamber 1, and has the first side coupled to communicate with the inside and the second side coupled to communicate with the outside.

Further, the internal chamber 2 includes an inner container body 23 disposed to make the external air introduced through the chamber external-air introducer 111 flow into the chamber external-air exhauster 112.

Figure 13:
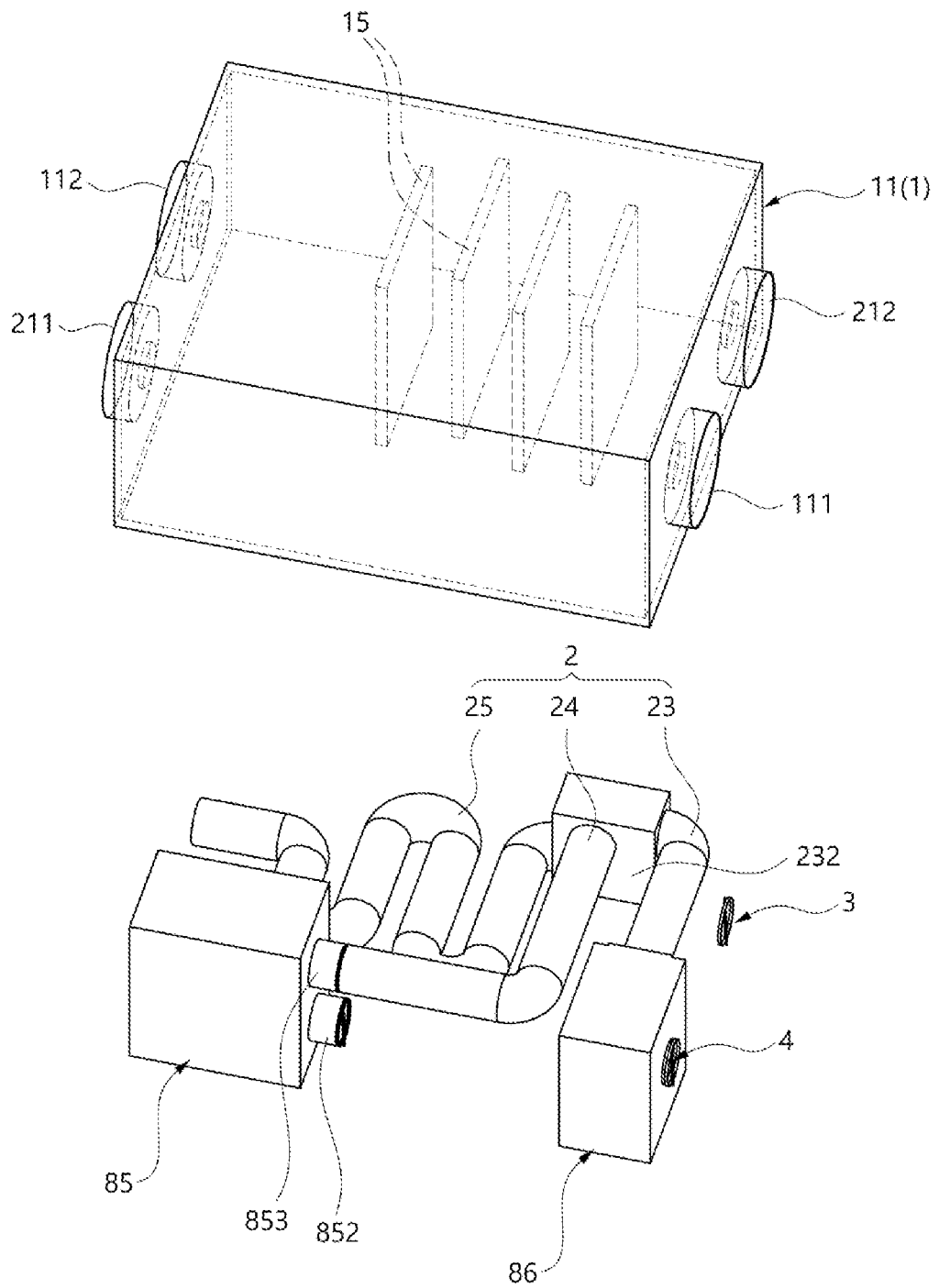
FIG. 13 is a perspective view of an external chamber separated from the smart air conditioner for reduction in fine dust and harmful gas according to the third embodiment of the disclosure.

The inner container body 23 is connected between the chamber external-air introducer 111 and the chamber external-air exhauster 112 and formed as a cylindrical duct as shown in FIG. 13.

Figure 12:
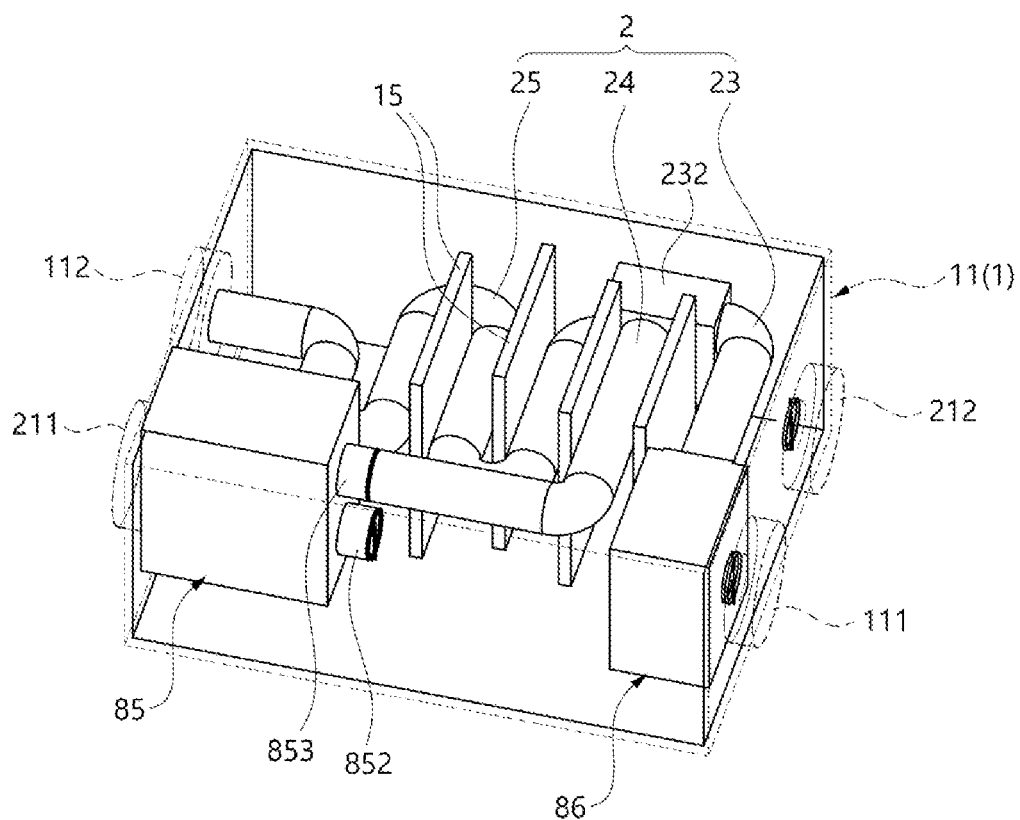
FIG. 12 is a perspective view showing an outer appearance of the smart air conditioner for reduction in fine dust and harmful gas according to the third embodiment of the disclosure.

FIG. 12 is a perspective view simply showing an outer appearance of the smart air conditioner for reduction in fine dust and harmful gas according to the third embodiment of the disclosure, the inside of which is seen through. FIG. 13 is a perspective view of an external chamber separated from the smart air conditioner for reduction in fine dust and harmful gas according to the third embodiment of the disclosure, and FIG. 14 is an exploded perspective view of main elements in the smart air conditioner for reduction in fine dust and harmful gas according to the third embodiment of the disclosure, in which FIGS. 13 and 14 illustrate the external chamber damper 3, the internal chamber damper 4, an external-air mix control damper 83 and an internal-air control damper 84 with their opening and closing portions without motors.

Figure 14:
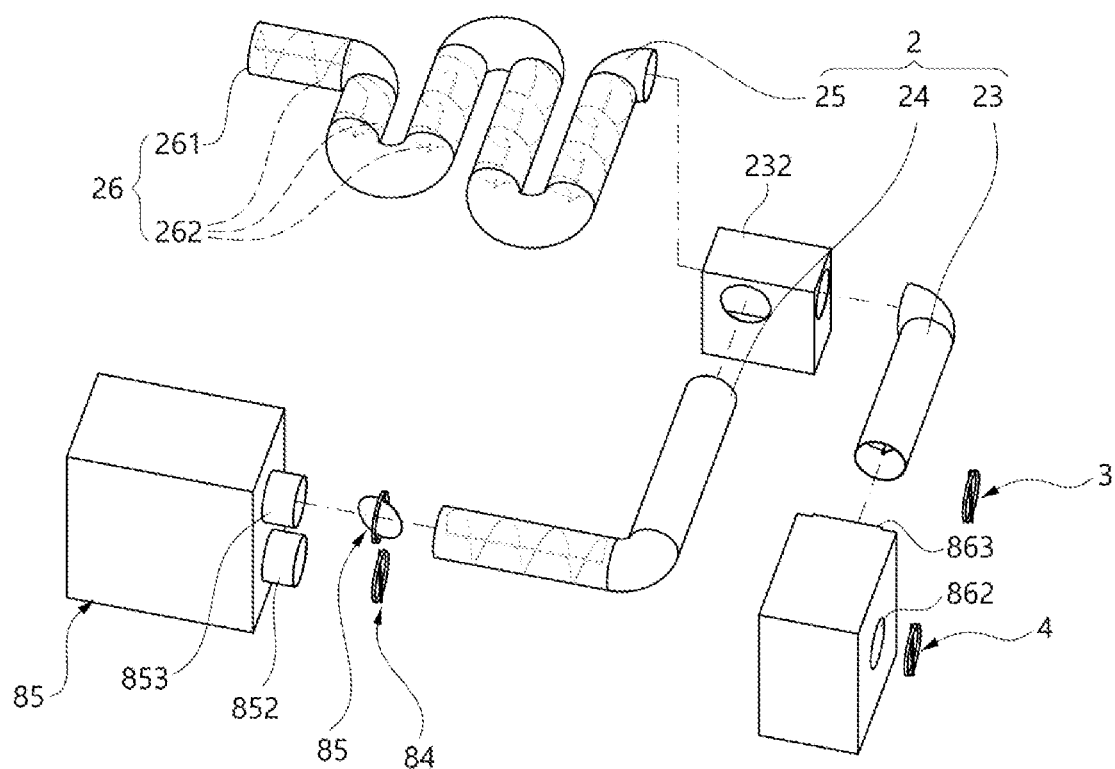
FIG. 14 is an exploded perspective view of main elements in the smart air conditioner for reduction in fine dust and harmful gas according to the third embodiment of the disclosure.

Referring to FIGS. 12 to 14, the internal chamber 2 includes a connection inner container body 24 for mixing the internal air and the external air, and the external-air mix control damper 83 and the internal-air control damper 84 are provided.

The connection inner container body 24 refers to a duct connected between the chamber internal-air introducer 211 and the inner container body 23, which has a first end connected to a first connector 853 of a first fan installation portion 85 (to be described later), and a second end connected to a duct connecting box 232 installed in a portion for connecting with the inner container body 23.

The external-air mix control damper 83 is installed to control air flowing toward the connection inner container body 24.

Here, the external-air mix control damper 83 is adjusted to be opened based on a desired mixing ratio when the internal air discharged from the inside and the external air introduced from the outside are mixed at a certain ratio and then reintroduced into the inside, and operates to be closed when the internal air is fully discharged to the chamber internal-air exhauster 212.

The internal-air control damper 84 refers to an element for controlling the flow of the internal air discharged outward, which is installed in a connection exhauster 852 of the first fan installation portion 85 (to be described later).

The external chamber damper 3 refers to an element for controlling the air flowing into the external chamber 1 and is installed in the chamber internal-air exhauster 212, and the internal chamber damper 4 refers to an element for controlling the air flowing into the internal chamber 2 and is installed in the chamber external-air introducer 111.

The external-air mix control damper 83, the internal-air control damper 84, the external chamber damper 3, and the internal chamber damper 4 are provided as opening and closing means for controlling the air flow, which are typically called a motor volume damper.

The external chamber fan 81 refers to an element that functions as the air exhaust fan to have suction force for making air flow into the external chamber 1, and is installed to be connected to the connection inner container body 24 adjoining the chamber internal-air introducer 211 in order to discharge air toward the chamber internal-air exhauster 212.

The internal chamber fan 82 refers to an element that functions as the air supply fan to have suction force for making air flow into the internal chamber 2, and is installed in the inner container body 23 adjoining the chamber external-air introducer 111.

Meanwhile, the smart air conditioner for reduction in fine dust and harmful gas according to the third embodiment of the disclosure includes the first fan installation portion 85 in which the external chamber fan 81 is installed, and a second fan installation portion 86 in which the internal chamber fan 82 is installed.

The first fan installation portion 85 is approximately shaped like a hexahedron, and includes a first fan installation box 851 installed in the connection inner container body 24 and internally provided with the external chamber fan 81, the connection exhauster 852 formed in the first fan installation box 851 and communicating with the inner space of the external chamber 1, the first connector 853 formed in the first fan installation box 851 and connecting with the connection inner container body 24, and a second connector 854 formed in the first fan installation box 851 and connecting with the chamber internal-air introducer 211.

Here, the external chamber fan 81 is installed in the first fan installation box 851, and therefore even a single fan is enough to not only discharge the internal air toward the inner space of the external chamber 1 through the connection exhauster 852 but also circulate the internal air toward a heat conductor 26 through the connection inner container body 24 (to be described later with reference to FIGS. 15*a* to 15*c*) while the fan operates opening and closing the external-air mix control damper 83 and the internal-air control damper 84, thereby making the air conditioner compact and simple.

Further, although it is not described in detail with reference to an additional drawing, the external chamber fan 81 may employ two fans as well as the single fan as described above. For example, the foregoing first fan installation portion 85 may be removed, and an additional duct (not shown) connected to the chamber external-air introducer 111 and communicating with the inner space of the external chamber 1 may be separately installed in addition to the connection inner container body 24 connected to the chamber external-air introducer 111 so that the connection inner container body 24 and the additional duct can be respectively provided with the external chamber fans independently of each other. Like this, when the external chamber fans are respectively installed in the connection inner container body 24 and the additional duct, each of the external chambers fan 81 may be selectively operated to discharge the internal air toward the inner space of the external chamber 1 and circulate the internal air in a direction toward the heat conductor 26.

The second fan installation portion 86 is approximately shaped like a hexahedron, and includes a second fan installation box 861 installed in the inner container body 23 and internally provided with the internal chamber fan 82, a third connector 862 formed in the second fan installation box 861 to connect and communicate with the chamber external-air introducer 111, and a fourth connector 863 formed in the second fan installation box 861 to connect with the inner container body 23.

Further, the first fan installation portion 85 includes the internal-air control damper 84 installed at the connection exhauster 852, and the external-air mix control damper 83 installed at the first connector 853, and the internal chamber damper 4 is installed at the third connector 862 of the second fan installation portion 86.

Meanwhile, the smart air conditioner for reduction in fine dust and harmful gas according to the third embodiment of the disclosure includes the heat conductor 26 to perform heat exchange by increasing stay time of air (external air) flowing toward the internal chamber 2.

The heat conductor 26, which is provided as a duct installed on the installation path of the inner container body 23, may have various shapes in consideration of heat exchange capacity, internal chamber fan capacity, etc. However, the external chamber 1 in this embodiment has a rectangular parallelepiped shape, and thus the heat conductor 26 is provided as a duct formed zigzag in the inner space adjoining the connection inner container body 24. In this case, the heat conductor 26 is stably kept in position by a guide member 15 shaped like a plate and installed in the external chamber 1.

Further, the duct of the heat conductor 26 includes a hollow duct main body 251 as shown in FIG. 14 for more effective heat exchange, and a curved channel forming portion 252 which is installed inside the duct main body 251 and on which a band member is spirally wound. Here, the curved channel forming portion 252 is spirally formed using a silicon material and then inserted and installed in the duct main body 251.

Below, the operations of the smart air conditioner for reduction in fine dust and harmful gas according to the third embodiment of the disclosure will be described in brief.

Figure 15A:
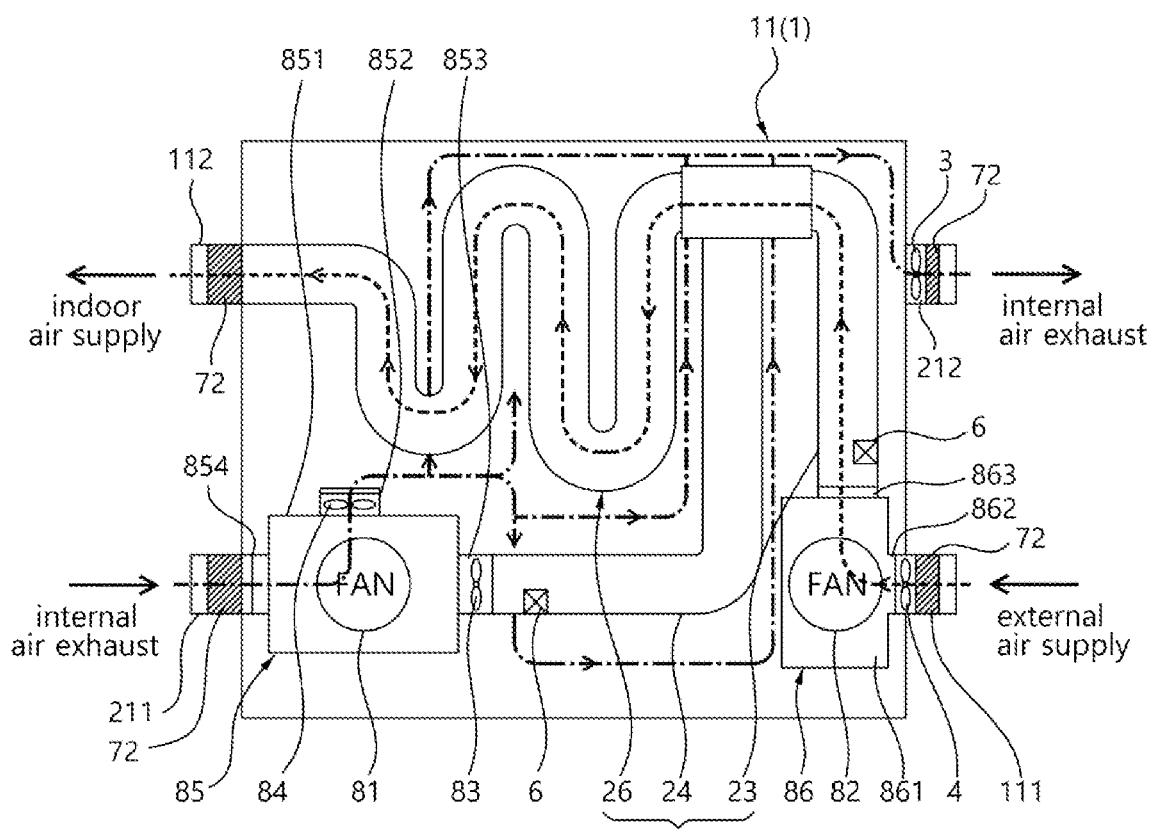
FIGS. 15a to 15c are views for describing operations of the smart air conditioner for reduction in fine dust and harmful gas according to the third embodiment of the disclosure.
Figure 15B:
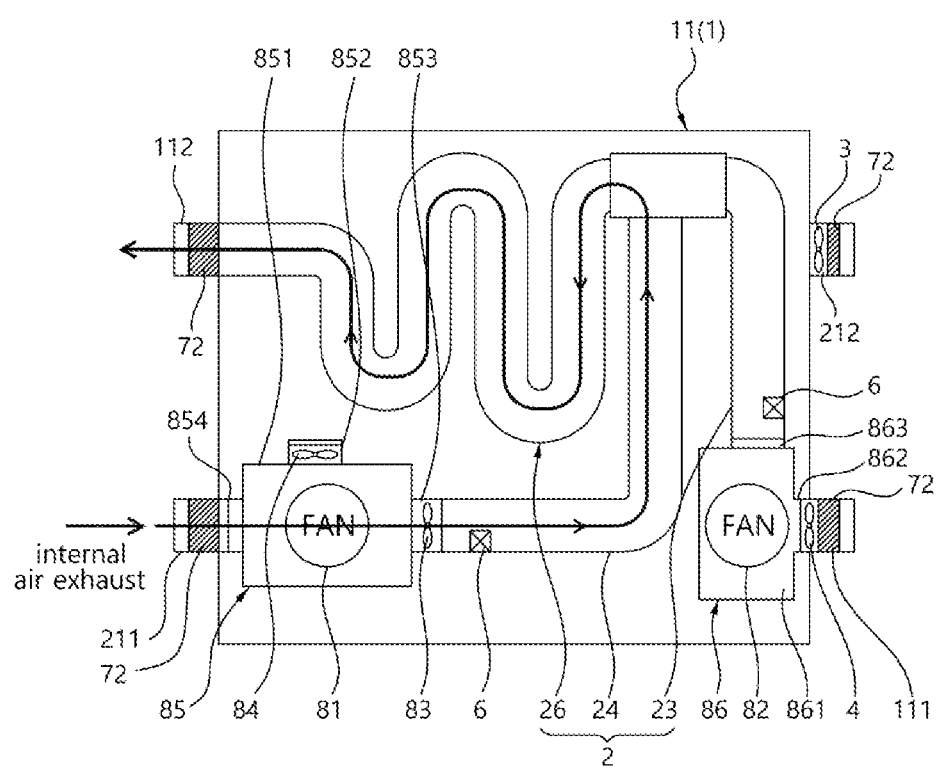
Figure 15C:
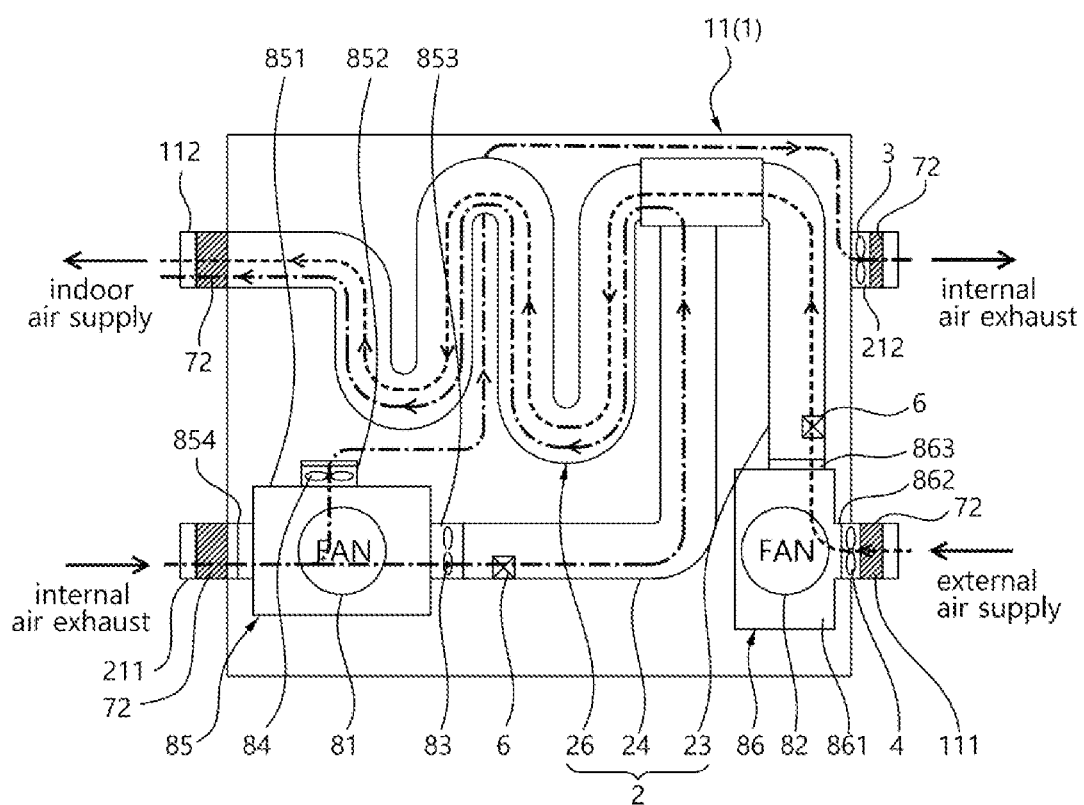

FIGS. 15*a* to 15*c* are views for describing operations of the smart air conditioner for reduction in fine dust and harmful gas according to the third embodiment of the disclosure, in which main elements are simplified and illustrated.

FIG. 15*a* shows the ventilation mode, i.e. an operation state at a point in time when ventilation is required as concentration of indoor fine dust or carbon dioxide increases, in which the external chamber fan 81 operates under control of the controller (not shown) while the external-air mix control damper 83 is closed and the internal-air control damper 84 and the external chamber damper 3 are opened, thereby discharging the internal air to the outside through the chamber internal-air exhauster 212 via the inner space of the external chamber 1.

At the same time, under control of the controller, the internal chamber fan 82 operates while the internal chamber damper 4 is opened, thereby allowing the external air to be introduced.

Like this, the external air introduced into the inner container body 23 by the suction force of the internal chamber fan 82 and flowing in the inner space primarily exchanges heat with the internal air moving through the inner space of the external chamber 1, and then secondarily exchanges heat with the heat conductor 26 while flowing via the heat conductor 26. In this case, the heat conductor 26 is formed zigzag to not only increase an area for exchanging heat with the internal air but also increase stay time by making the external air pass through the spirally formed curved-channel forming portion 262 and enhance the heat exchange efficiency between the internal air and the external air through turbulence caused by confluence.

As described above, the smart air conditioner for reduction in fine dust and harmful gas according to the third embodiment of the disclosure allows the external air introduced into the inside to previously exchange heat with the waste heat of the internal air, thereby decreasing cooling and heating loads to reduce energy costs and preventing malfunctioning due to icemaking in winter.

FIG. 15b is a view for showing an indoor air purification mode, i.e. an operation state at a point in time when ventilation is not required because concentration of carbon dioxide contained in indoor air is proper but air purification for removing fine dust is needed because the fine dust is increased.

Referring to FIG. 15b, the indoor air purification mode is performed as follows. Under control of the controller, the internal-air control damper 84 is closed, the external-air mix control damper 83 is opened, and the internal chamber damper 4 is closed to prevent the introduction of the external air.

In this state, when the external chamber fan 81 operates, the internal air is introduced through the chamber internal-air introducer 211, flows in the connection inner container body 24, passes through the heat conductor 26, and is then reintroduced into the indoor space through the chamber external-air exhauster 112.

In this case, the indoor polluted internal air is purified as the fine dust or the like is removed by filtering operations of the filtering means 72 installed to adjoin the chamber internal-air introducer 211 and the filtering means 72 installed to adjoin the chamber external-air exhauster 112.

As described above, in the indoor air purification mode, only the purification process is performed by removing pollutants from the indoor air and then circulating the indoor air without the introduction of the external air or the heat exchange with the external air, and therefore there are no needs of wastefully discharging the cooled or heated internal air to the outside for the purpose of ventilation, thereby decreasing cooling and heating loads and thus reducing energy costs.

Meanwhile, FIG. 15c is a view for showing an air mixing ventilation mode, i.e. an operation state at a point in time when ventilation is required to some extent even though concentration of carbon dioxide or fine dust contained in indoor air is not very bad.

In the foregoing indoor air purification mode, when a pollution degree of internal air or external air is detected based on a sensing signal obtained by the condition sensing means 6 and it is identified that there is a need of entering the air mixing ventilation mode, the external chamber damper 3 and the internal chamber damper 4 are opened, the external-air mix control damper 83 and the internal-air control damper 84 are opened at a proper opening angle, and the external chamber fan 81 and the internal chamber fan 82 are driven under control of the controller, thereby mixing the external air into the internal air and circulating the mixed air.

In more detail, the foregoing air mixing ventilation mode refers to a mode in which the internal air is partially discharged to the outside through the chamber internal-air exhauster 212 via the inner space of the external chamber 1 and the other internal air flows in the connection inner container body 24 through the external-air mix control damper 83, flows to the heat conductor 26 while mixing with the external air introduced through the inner container body 23, and then flows into the indoor space through the chamber external-air exhauster 112 as shown in FIG. 15c. In the air mixing ventilation mode, the ventilation is partially carried out based on how much the internal air or external air is polluted, thereby decreasing cooling and heating loads and thus reducing energy costs.

Below, the smart air conditioner for reduction in fine dust and harmful gas according to a fourth embodiment of the disclosure will be described, in which detailed descriptions will be avoided and the same reference numerals will be given with regard to elements similar to those of the third embodiment.

Figure 16:
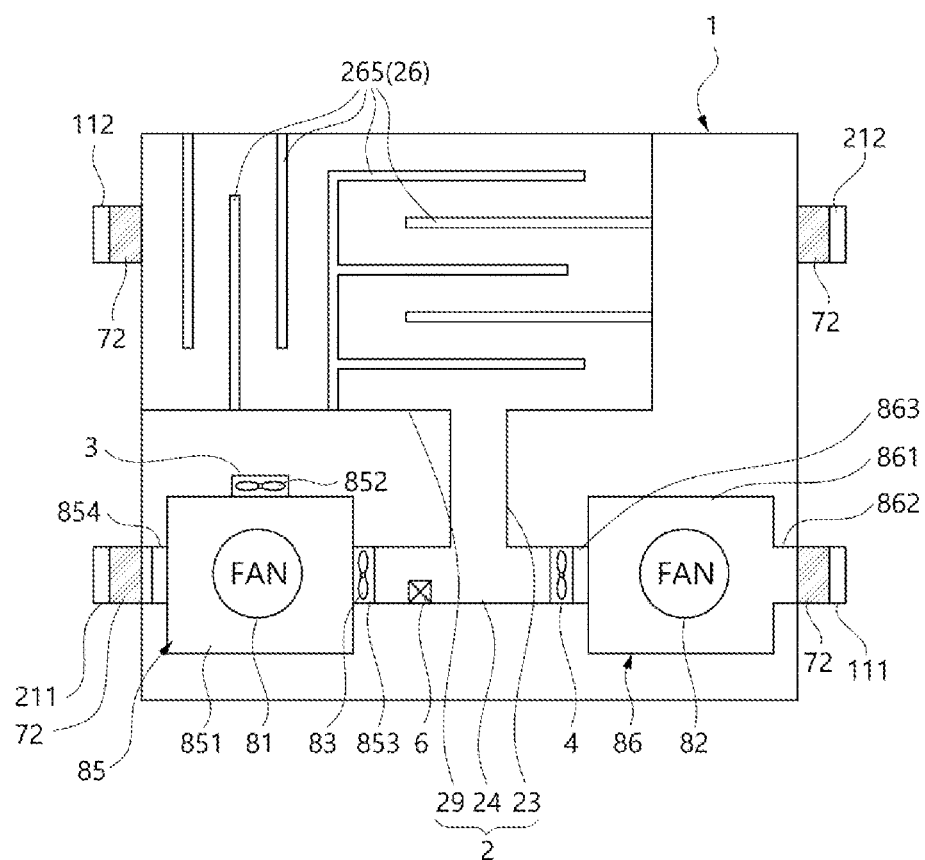
FIG. 16 is a schematic view for describing technical concept of a smart air conditioner for reduction in fine dust and harmful gas according to another embodiment of the disclosure.

FIG. 16 is a schematic view for describing technical concept of a smart air conditioner for reduction in fine dust and harmful gas according to the fourth embodiment of the disclosure, in which major elements are simplified and illustrated with symbols.

Referring to FIG. 16, the smart air conditioner for reduction in fine dust and harmful gas according to the fourth embodiment of the disclosure includes an external chamber 1, an internal chamber 2, an external chamber damper 3, an internal chamber damper 4, an external chamber fan 81 and an internal chamber fan 82, in which the external chamber is configured as the outer container body, and the internal chamber 2 includes an inner container body 23 disposed to make external air introduced through a chamber external-air introducer 111 flow into a chamber external-air exhauster 112, and a partition wall 29 installed in the inner space of the outer container body 11 to form a divided space communicating with the inner container body 23 and surrounding the chamber external-air exhauster 112.

Like the foregoing embodiment, the outer container body 11 is formed with a chamber internal-air introducer 211 through which the internal air is introduced, a chamber internal-air exhauster 212 through which the internal air is discharged, a chamber external-air introducer 111 through which the external air is introduced, and a chamber external-air exhauster 112 through which the external air is discharged.

Figure 17:
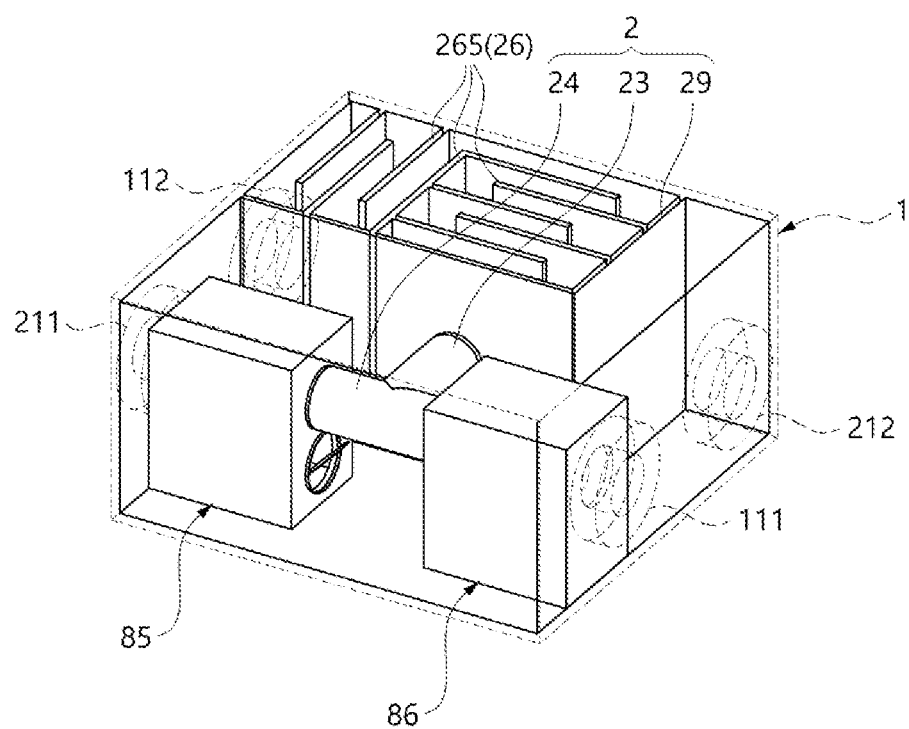
FIG. 17 is a perspective view showing an outer appearance of a smart air conditioner for reduction in fine dust and harmful gas according to another embodiment of the disclosure.
Figure 18:
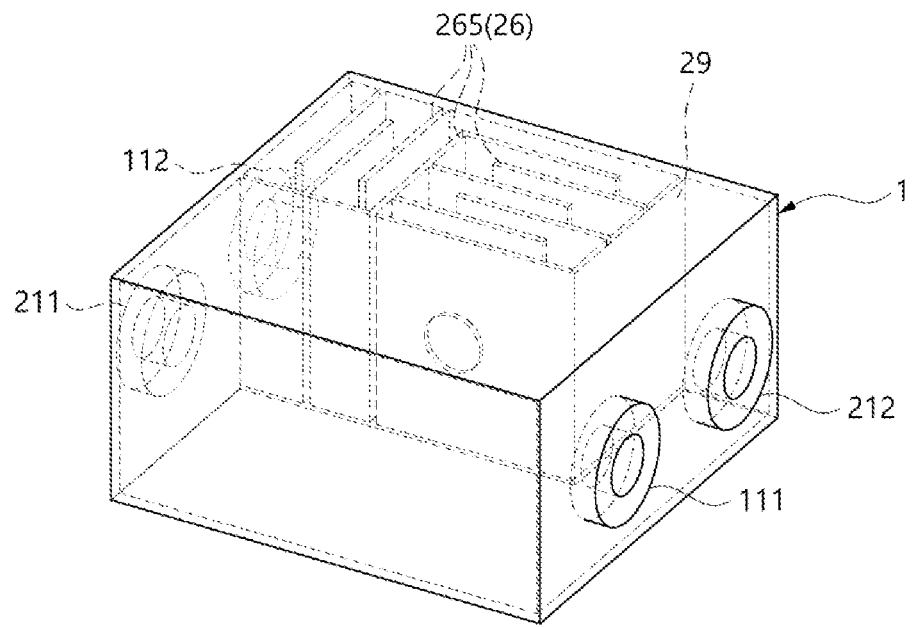
FIG. 18 is a perspective view of an external chamber separated from a smart air conditioner for reduction in fine dust and harmful gas according to another embodiment of the disclosure.
Figure 18:
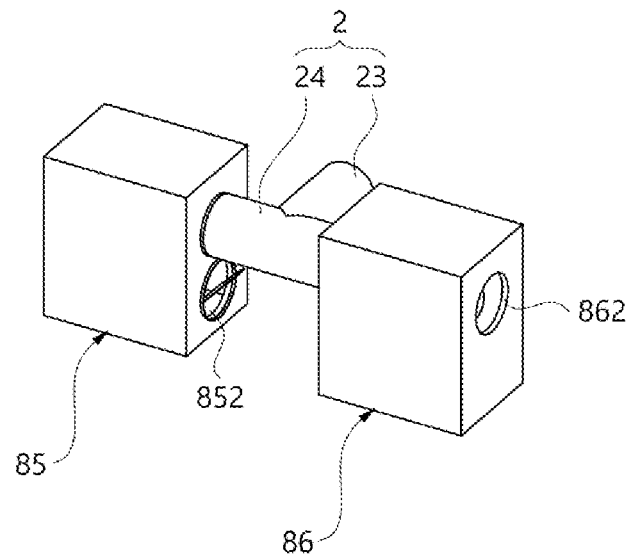

The accompanying drawing of FIG. 17 is a perspective view for simply showing an outer appearance of the smart air conditioner for reduction in fine dust and harmful gas according to the fourth embodiment of the disclosure, the inside of which is seen through. FIG. 18 is a perspective view of an external chamber separated from a smart air conditioner for reduction in fine dust and harmful gas according to the fourth embodiment of the disclosure, and FIG. 19 is an exploded perspective view of main elements in a smart air conditioner for reduction in fine dust and harmful gas according to the fourth embodiment of the disclosure.

Figure 19:
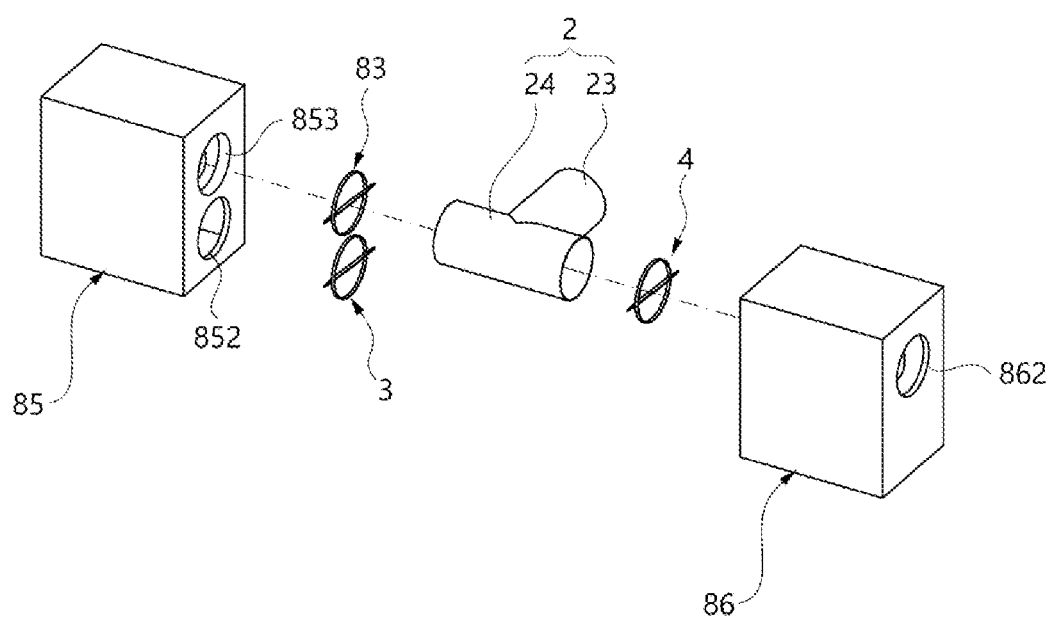
FIG. 19 is an exploded perspective view of main elements in a smart air conditioner for reduction in fine dust and harmful gas according to another embodiment of the disclosure.

Referring to FIGS. 17 to 19, the internal chamber 2 includes the inner container body 23 disposed to make the external air introduced through the chamber external-air introducer 111 flow into the chamber external-air exhauster 112, and the connection inner container body 24 connected between the chamber internal-air introducers 211.

The external chamber fan 81 refers to an element that functions as the air exhaust fan to have suction force for making air flow into the external chamber 1, and is installed in the connection inner container body 24 to control the flow of the internal air discharged to the outside.

The internal chamber fan 82 refers to an element that functions as the air supply fan to have suction force for making the external air flow into the internal chamber 2, and is installed in the inner container body 23 adjoining the chamber external-air introducer 111.

Further, the internal chamber 2 is installed with the external-air mix control damper 83 in the connection inner container body 24 to control air flowing toward the inner container body 23, and is installed with the internal chamber damper 4 facing the external-air mix control damper 83 in the inner container body 23 adjoining the internal chamber fan 82.

Meanwhile, the smart air conditioner for reduction in fine dust and harmful gas according to the fourth embodiment of the disclosure includes the first fan installation portion 85 in which the external chamber fan 81 is installed, and the second fan installation portion 86 in which the internal chamber fan 82 is installed.

The first fan installation portion 85 includes the first fan installation box 851 installed in the connection inner container body 24 and internally provided with the external chamber fan 81, the connection exhauster 852 formed in the first fan installation box while communicating with the inner space of the external chamber 1 and installed with the external chamber damper 3, the first connector 853 formed in the first fan installation box 851 and connecting with the external-air mix control damper 83, and the second connector 854 formed in the first fan installation box and connecting and connecting with the chamber internal-air introducer 211.

The second fan installation portion 86 includes the second fan installation box 861 installed in the inner container body 23 and internally provided with the internal chamber fan 82, the third connector 862 formed in the second fan installation box 861 to connect and communicate with the chamber external-air introducer 111, and the fourth connector 863 formed in the second fan installation box 861 to connect with the inner container body 23.

Meanwhile, the internal chamber 2 includes the heat conductor 26 communicating with the inner container body 23 inside the partition wall 29 to enhance the heat exchange efficiency.

The heat conductor 26 includes a plurality of thermal conductive plates 265 arranged to form a zigzag channel.

Here, there are no specific limits to the number and shape of arranged thermal conductive plates 265 as long as they enhance the heat exchange efficiency. As shown in FIG. 16, the heat conductor 26 in this embodiment includes a plurality of vertical thermal conductive plates spaced apart in a vertical direction to face the chamber external-air exhauster 112, and a plurality of horizontal thermal conductive plates spaced apart in a horizontal direction to face an inside hole in a portion for connection with the inner container body 23.

Below, the operations of the smart air conditioner for reduction in fine dust and harmful gas according to the fourth embodiment of the disclosure will be described in brief.

Figure 20A:
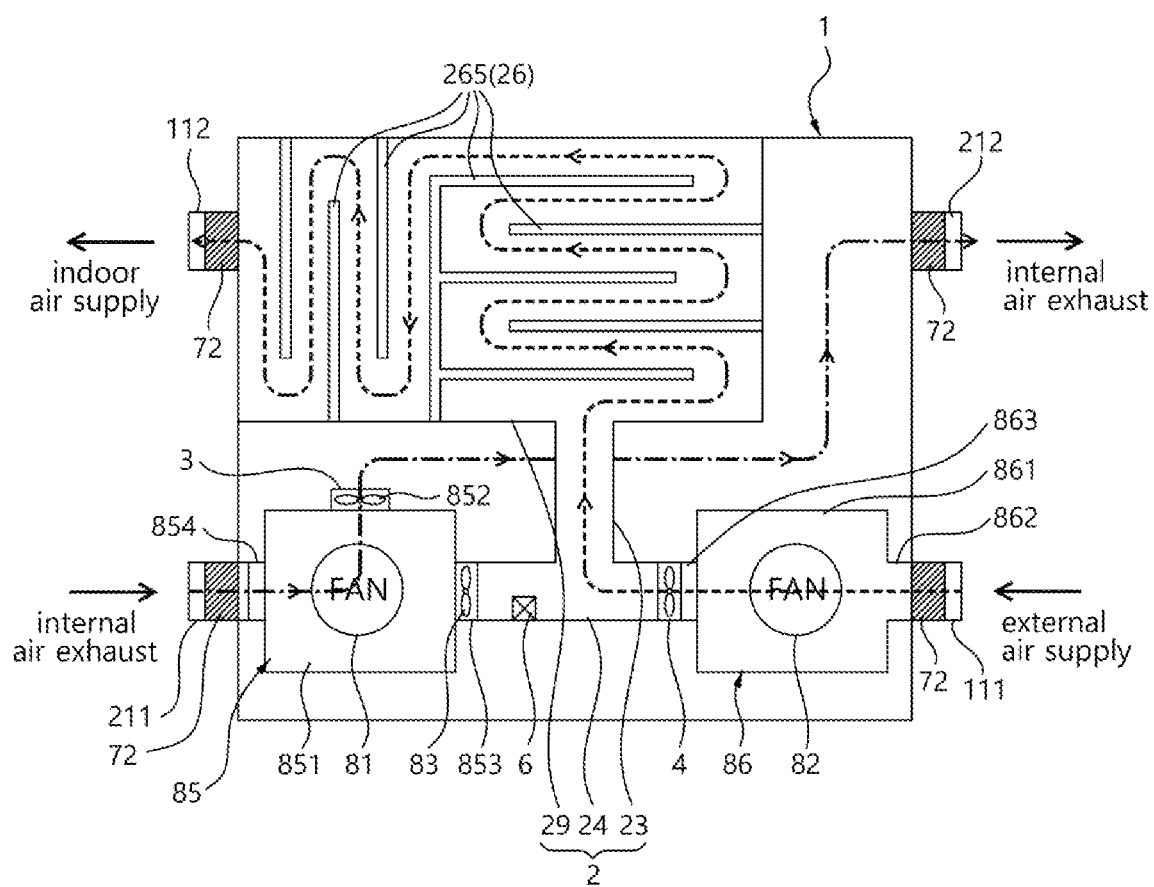
FIGS. 20a to 20c are views for describing operations of a smart air conditioner for reduction in fine dust and harmful gas according to the third embodiment of the disclosure.
Figure 20B:
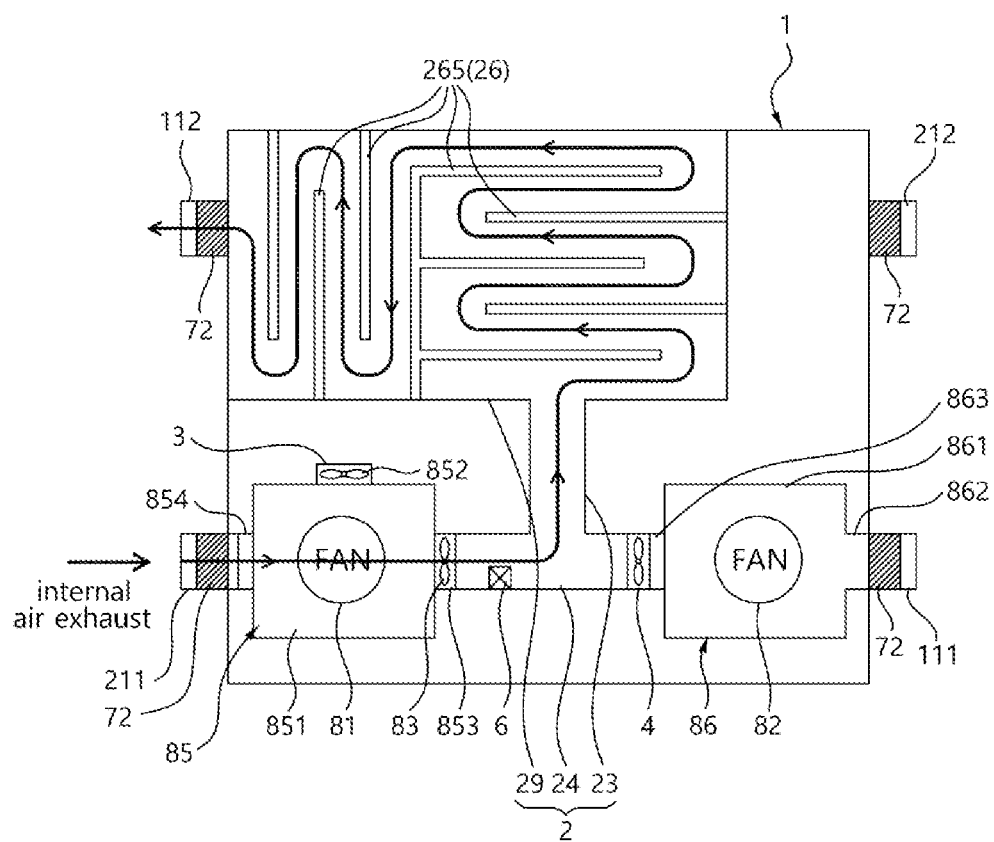
Figure 20C:
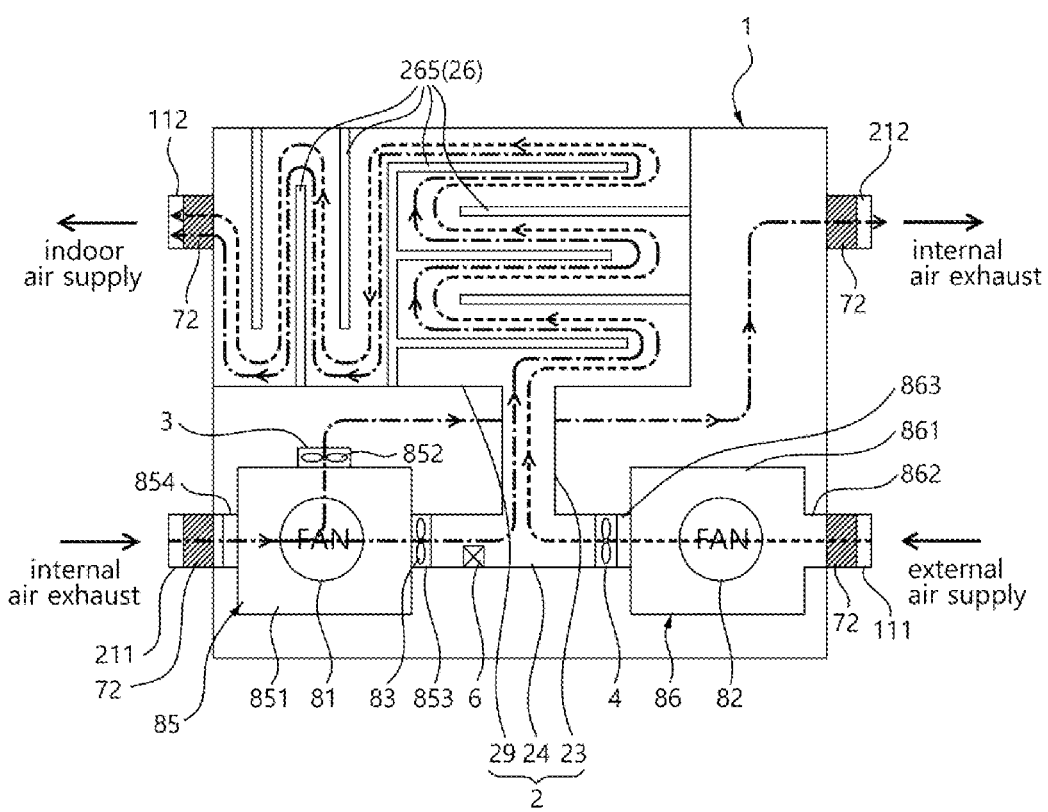

FIGS. 20a to 20c are views for describing operations of a smart air conditioner for reduction in fine dust and harmful gas according to the fourth embodiment of the disclosure, in which main elements are simplified and illustrated.

FIG. 20a shows the ventilation mode, i.e. an operation state at a point in time when ventilation is required as concentration of indoor fine dust or carbon dioxide increases, in which, under control of the controller (not shown), the external chamber fan 81 operates while the external-air mix control damper 83 is closed and the external chamber damper 3 is opened, thereby discharging the internal air to the chamber internal-air exhauster 212 via the inner space of the external chamber 1, and at the same time the internal chamber fan 82 operates while the internal chamber damper 4 is opened, thereby allowing the external air to be introduced.

The external air introduced into the inner container body 23 by the suction force of the internal chamber fan 82 and moving is subjected to the primary heat exchange with the internal air moving through the inner space of the external chamber 1, and then subjected to the secondary heat exchange while passing through the heat conductor 26. In this case, the heat conductor 26 is formed as a zigzag channel with the plurality of thermal conductive plates 265, and thus the stay time of the external air and the heat exchange area are increased, thereby improving the efficiency of exchanging heat with the internal air.

FIG. 20b is a view for showing an indoor air purification mode, i.e. an operation state at a point in time when ventilation is not required because concentration of carbon dioxide contained in internal air is proper but air purification for removing fine dust or the like pollutants is needed because the fine dust is increased.

Referring to FIG. 20b, the indoor air purification mode is performed as follows. Like the foregoing embodiment, under control of the controller, the internal-air control damper 84 is closed, the external-air mix control damper 83 is opened, and the internal chamber damper 4 is closed to prevent the introduction of the external air.

In this state, when the external chamber fan 81 operates, the internal air is introduced through the chamber internal-air introducer 211, flows in the connection inner container body 24, passes through the heat conductor 26, and is then reintroduced into the indoor space through the chamber external-air exhauster 112.

In this case, the indoor polluted internal air is purified as the fine dust or the like is removed by filtering operations of the filtering means 72 installed to adjoin the chamber internal-air introducer 211 and the filtering means 72 installed to adjoin the chamber external-air exhauster 112.

Meanwhile, FIG. 20c is a view for showing an air mixing ventilation mode, i.e. an operation state at a point in time when ventilation is required to some extent even though concentration of carbon dioxide or fine dust contained in indoor air is not very bad, the operations of which will be described in brief because the operations are similar to those of the foregoing embodiment.

In the foregoing indoor air purification mode, when a pollution degree of internal air or external air is detected based on a sensing signal obtained by the condition sensing means 6 and it is identified that there is a need of entering the air mixing ventilation mode, the external chamber damper 3 and the internal chamber damper 4 are opened, the external-air mix control damper 83 is opened at a proper opening angle based on an air polluted degree, internal air temperature, etc., and the external chamber fan 81 and the internal chamber fan 82 are driven under control of the controller, thereby mixing the external air into the internal air and circulating the mixed air.

Although the configurations and operations of the smart air conditioner for reduction in fine dust and harmful gas have been described according to the foregoing embodiments of the disclosure, the embodiments are for illustrative purpose only and it will be appreciated by a person having an ordinary skill in the art that some substitutions and modifications in the foregoing embodiments can be made without departing from the technical spirit of the disclosure.

Accordingly, it will be understood that the scope of the disclosure is defined in the appended claims and their equivalents.

INDUSTRIAL APPLICABILITY

The disclosure is installed in an air conditioning system and applied to a smart air conditioner for reduction in fine dust and harmful gas, in which external air previously exchanges heat with internal air before being introduced into the inside, ventilation is partially performed as necessary according to the states of the internal air and external air, and the internal air is not ventilated but circulated to remove pollutants contained in the internal air.

The invention claimed is:

1. A smart air conditioner for reduction in fine dust and harmful gas, to be coupled to a ventilation apparatus comprising an air supply port and an air exhaust port, the smart air conditioner comprising:
    an external chamber having a first side coupled to communicate with the ventilation apparatus and a second side configured to communicate with an outside of the smart air conditioner;
    an internal chamber disposed to pass through an inside of the external chamber and having a first side coupled to communicate with the ventilation apparatus and a second side configured to communicate with the outside of the smart air conditioner;
    an external chamber damper disposed in the external chamber and configured to control air flow; and
    an internal chamber damper disposed in the internal chamber and configured to control air flow,
    wherein the external chamber has an outer container body having a chamber external-air introducer and a chamber external-air exhauster configured to be connected to the air supply port to supply external air introduced from the chamber external-air introducer,
    wherein the internal chamber has an inner container body having a chamber internal-air introducer configured to be connected to the air exhaust port, the inner container body having a chamber internal-air exhauster configured to communicate with an outside of the outer container body,
    wherein the internal chamber has a branch configured to communicate with an inner space of the external chamber,
    wherein the internal chamber damper has an internal-air exhaust-control two-way damper disposed in the chamber internal-air exhauster and an internal-air circulation-control two-way damper disposed in the branch, or the internal chamber damper has a three-way damper disposed in the branch, the three-way damper being configured to control exhaust and circulation of internal air, and
    wherein the external chamber damper has an external-air inflow-control two-way damper disposed in the chamber external-air introducer.

2. The smart air conditioner for reduction in fine dust and harmful gas according to claim 1, further comprising a heat conductor disposed in the internal chamber to carry out heat exchange based on temperature difference between air in the external chamber and air in the internal chamber,
    wherein the heat conductor has at least one selected from a wrinkled portion disposed in the internal chamber and a heat transfer member disposed in the internal chamber.

3. The smart air conditioner for reduction in fine dust and harmful gas according to claim 1, further comprising an air flowing guide configured to form turbulence and increase stay time of air flowing through the external chamber,
    wherein the air flowing guide has a spiral guiding member disposed between the external chamber and the internal chamber, or a plurality of air guide plates alternately disposed to form a zigzag channel between the external chamber and the internal chamber.

4. The smart air conditioner for reduction in fine dust and harmful gas according to claim 1, further comprising:
    a condition sensing means disposed in at least one of the ventilation apparatus, the external chamber and the internal chamber;
    a controller configured to control the external chamber damper, the internal chamber damper and the ventilation apparatus to be driven based on a detection signal from the condition sensing means;
    a heating means disposed inside the external chamber or the internal chamber and configured to raise temperature of air; and
    a filtering means disposed inside the external chamber or the internal chamber and configured to purify air,
    wherein the condition sensing means has at least one selected among a pressure sensing means, a temperature sensing means, a humidity sensing means, an electric conductivity sensing means, a gas sensing means, a flowrate measurement means, and a fine-dust concentration-measurement means.

5. The smart air conditioner for reduction in fine dust and harmful gas according to claim 1, further comprising a water remover configured to remove water produced inside the external chamber or the internal chamber,
    wherein the water remover comprises has a drain line disposed in the external chamber, and
    wherein the water remover further has at least one among a dehumidifier module configured to perform dehumidification when powered on, a hydrophobic coating layer disposed on an outer surface of the internal chamber and an inner surface of the external chamber, a control valve disposed in the drain line, and a drain-line heat-generation means disposed in the drain line.

6. The smart air conditioner for reduction in fine dust and harmful gas according to claim 1,
    wherein the first side and the second side of the internal chamber has holes disposed to diagonally face each other, and
    wherein the first side and the second side of the external chamber has holes disposed to diagonally face each other, and the holes of the external chamber and the holes of the internal chamber are disposed in misaligned directions.

\* \* \* \* \*